(12) United States Patent
Keeler et al.

(10) Patent No.: US 12,241,422 B2
(45) Date of Patent: Mar. 4, 2025

(54) AIRCRAFT OPERATION

(71) Applicant: ROLLS-ROYCE PLC, London (GB)

(72) Inventors: Benjamin J Keeler, Derby (GB); David M Beaven, Nottingham (GB); Craig W Bemment, Derby (GB); Paul W Ferra, Derby (GB); Kevin R McNally, Derby (GB); Andrea Minelli, Derby (GB); Martin K Yates, Northamptonshire (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/212,290

(22) Filed: Jun. 21, 2023

(65) Prior Publication Data

US 2024/0117771 A1    Apr. 11, 2024

Related U.S. Application Data

(63) Continuation of application No. 17/853,333, filed on Jun. 29, 2022, now Pat. No. 11,859,565.

(30) Foreign Application Priority Data

Dec. 21, 2021   (GB) .................................... 2118650

(51) Int. Cl.
  *F02C 9/28*        (2006.01)
(52) U.S. Cl.
  CPC .......... *F02C 9/28* (2013.01); *F05D 2220/323* (2013.01); *F05D 2240/35* (2013.01); *F05D 2270/3013* (2013.01); *F05D 2270/303* (2013.01); *F05D 2270/309* (2013.01)

(58) Field of Classification Search
  CPC ......... F02C 9/28; F02C 7/224; F23N 2221/10
  See application file for complete search history.

(56) References Cited

U.S. PATENT DOCUMENTS

| 4,078,378 | A | 3/1978 | Gold |
| 4,354,345 | A * | 10/1982 | Dreisbach, Jr. ......... F02C 7/224 60/39.08 |
| 5,357,748 | A | 10/1994 | Khalid |
| 6,226,976 | B1 | 5/2001 | Scott et al. |
| 6,810,676 | B2 | 11/2004 | O'Connor |
| 8,396,643 | B2 | 3/2013 | Nomura et al. |

(Continued)

FOREIGN PATENT DOCUMENTS

| EP | 2333280 B1 | 11/2017 |
| GB | 2587678 A | 4/2021 |

OTHER PUBLICATIONS

Oct. 18, 2023 Search Report issued in French Patent Application No. 2213813.

(Continued)

*Primary Examiner* — Katheryn A Malatek
(74) *Attorney, Agent, or Firm* — Oliff PLC

(57) ABSTRACT

A method of determining at least one fuel characteristic of a fuel provided to a gas turbine engine of an aircraft includes making an operational change, the operational change being effected by a controllable component of a propulsion system of which the gas turbine engine forms a part, and being arranged to affect operation of the gas turbine engine, sensing a response to the operational change; and determining the at least one fuel characteristic based on the response to the operational change.

19 Claims, 6 Drawing Sheets

(56) References Cited

U.S. PATENT DOCUMENTS

| | | |
|---|---|---|
| 8,484,981 B2 | 7/2013 | Nag |
| 8,510,014 B2 | 8/2013 | Nomura et al. |
| 9,255,525 B2 | 2/2016 | Ewens et al. |
| 9,656,762 B2 | 5/2017 | Kamath et al. |
| 9,957,832 B2 | 5/2018 | Schwarz et al. |
| 10,012,151 B2 | 7/2018 | Thatcher et al. |
| 10,259,590 B2 | 4/2019 | Swann |
| 10,267,230 B2 | 4/2019 | Budge |
| 11,506,133 B2 | 11/2022 | Klingbeil et al. |
| 2009/0064682 A1 | 3/2009 | Healy et al. |
| 2009/0319153 A1 | 12/2009 | Bradley et al. |
| 2011/0126545 A1 | 6/2011 | Loeven, II |
| 2011/0160979 A1 | 6/2011 | Muller |
| 2011/0185702 A1* | 8/2011 | Bilton .................. F02C 9/40 60/39.182 |
| 2011/0203291 A1* | 8/2011 | Erickson .............. F02C 9/28 60/776 |
| 2013/0167541 A1 | 7/2013 | Bathina et al. |
| 2014/0033731 A1 | 2/2014 | Rackwitz |
| 2014/0257666 A1 | 9/2014 | Abrol et al. |
| 2015/0266589 A1 | 9/2015 | Blumer et al. |
| 2015/0284101 A1 | 10/2015 | Swann |
| 2015/0315978 A1 | 11/2015 | Davies et al. |
| 2015/0354466 A1 | 12/2015 | Higashi et al. |
| 2016/0025339 A1 | 1/2016 | Kamath et al. |
| 2017/0370297 A1 | 12/2017 | Vela |
| 2018/0142627 A1 | 5/2018 | Harper et al. |
| 2020/0400068 A1 | 12/2020 | Bemment et al. |

OTHER PUBLICATIONS

World Nuclear Association, Heat Values of Various Fuels, Aug. 2018, retrieved via Wayback Machine using: https://world-nuclear.org/information-library/facts-and-figures/heat-values-of-various-fuels.aspx (Year: 2018).

Randall C. Boehm et al., Lower heating value of jet fuel from hydrocarbon class concentration data and thermo-chemical reference data: An uncertainty quantification, Nov. 18, 2021, retrieved from Elsevier, Fuel 311 (2022) 122542 (Year: 2021).

May 8, 2023 Search Report issued in European Patent Application No. 22209108.4.

May 9, 2023 Search Report issued in Great Britain Patent Application No. 2217415.5.

Schumann, U. et al. "Influence of Fuel Sulfur on the Composition of Aircraft Exhaust Plumes: The Experiments SULFUR 1-7", Journal of Geophysical Research, vol. 107, No. D15, 4247, Aug. 2002.

Haglind, F. "Potential of Lowering the Contrail Formation of Aircraft Exhausts by Engine Re-Design", Aerospace Science and Technology, vol. 12, Dec. 2007, pp. 490-497.

Gillette, W. "Naphthalene Removal Assessment Project 39", FAA Center of Excellence For Alternative Jet Fuels & Environment; Oct. 2019.

\* cited by examiner

AIRCRAFT OPERATION

CROSS-REFERENCE TO RELATED APPLICATIONS

This application is a continuation of U.S. application Ser. No. 17/853,333, filed on 29 Jun. 2022, which claims priority from United Kingdom Patent Application Number 2118650.7 filed on 21 Dec. 2021. The entire contents of each of these applications are incorporated herein by reference in their entirety.

BACKGROUND

Field of the Disclosure

The present disclosure relates to aircraft propulsion systems, and to methods of operating aircraft involving adaptations for fuels with different characteristics, and to methods of determining relevant fuel characteristics so as to allow such methods to be implemented.

Description of the Related Art

There is an expectation in the aviation industry of a trend towards the use of fuels different from the traditional kerosene-based jet fuels generally used at present. These fuels may have differing fuel characteristics, for example having either or both of a lower aromatic content and sulphur content, relative to petroleum-based hydrocarbon fuels.

Thus, there is a need to take account of fuel properties in light of the increased possibility of variation, and to adjust the control and management of aircraft propulsion systems and fuel supplies for these new fuels.

SUMMARY

According to a first aspect there is provided a method of controlling a propulsion system of an aircraft, the propulsion system comprising: a gas turbine engine arranged to be powered by a fuel; and at least one variable inlet guide vane (VIGV). The method comprises:
  obtaining at least one fuel characteristic of the fuel being provided to the gas turbine engine; and
  making a change to scheduling of the at least one VIGV based on the at least one obtained fuel characteristic.

The at least one fuel characteristic may be or comprise at least one of:
  percentage of sustainable aviation fuel in the fuel;
  aromatic hydrocarbon content of the fuel;
  multi-aromatic hydrocarbon content of the fuel;
  percentage of nitrogen-containing species in the fuel;
  presence or percentage of a tracer species or trace element in the fuel (e.g. a trace substance inherently present in the fuel which may vary between fuels and so be used to identify a fuel, and/or a substance added deliberately to act as a tracer);
  hydrogen to carbon ratio of the fuel;
  hydrocarbon distribution of the fuel;
  level of non-volatile particulate matter emissions on combustion (e.g. on combustion for a given combustor design, at a given operating condition);
  naphthalene content of the fuel;
  sulphur content of the fuel;
  cycloparaffin content of the fuel;
  oxygen content of the fuel;
  thermal stability of the fuel;
  level of coking of the fuel;
  an indication that the fuel is a fossil fuel; and
  at least one of density, viscosity, calorific value, and heat capacity.

The at least one fuel characteristic may be or comprise a calorific value of the fuel.

The at least one fuel characteristic may be or comprise a heat capacity of the fuel.

The step of making a change to scheduling of the at least one VIGV may comprise moving at least one VIGV.

The step of making a change to scheduling of the at least one VIGV may comprise preventing or cancelling an intended movement of at least one VIGV. For example, a step of closing a VIGV normally performed with a certain fuel, such as the widely-used Jet A, at a certain point in the flight envelope may be cancelled if the fuel in use has a higher calorific value than Jet A.

The propulsion system may comprise a plurality of fluidly separated fuel tanks containing different fuels such that the fuel supplied to the gas turbine engine can be changed in flight.

In such cases, the step of obtaining the at least one fuel characteristic of the fuel being provided to the gas turbine engine may comprise determining a current fuel or fuel blend being supplied to the gas turbine engine and obtaining the one or more characteristics for that fuel.

The step of obtaining the at least one fuel characteristic may be repeated:
  (i) at regular intervals;
  (ii) each time the fuel or fuel blend supplied to the gas turbine engine is changed; or
  (iii) before each change to VIGV scheduling.

The step of obtaining the at least one fuel characteristic may comprise at least one of:
  (i) detecting the at least one fuel characteristic, for example by physical and/or chemical detection methods, or detecting parameters from which the fuel characteristic may be derived; and
  (ii) retrieving at least one fuel characteristic, or data from which at least one fuel characteristic may be calculated, from data storage.

The at least one fuel characteristic may be or comprise a calorific value of the fuel—in such cases, the step of making a change to VIGV scheduling may comprise opening the at least one VIGV at take-off by 1% of its range for each 1% increase in calorific value of the fuel.

A linear, or near-linear, change in VIGV angle may therefore be made with calorific value change.

The at least one VIGV may have a full rotation range of 40°.

The at least one fuel characteristic may be or comprise a heat capacity of the fuel—in such cases, the step of making a change to VIGV scheduling may comprise opening the at least one VIGV at take-off by 0.5% of its range for a 30% increase in heat capacity of the fuel. A linear, or near-linear, change in VIGV angle may be made with heat capacity.

The opening the at least one VIGV by 0.5% of its range for a 30% change in heat capacity of the fuel may be performed only up to a maximum additional opening of 5% of full VIGV movement range. The at least one VIGV may have a full rotation range of 40°.

According to a second aspect, there is provided a propulsion system for an aircraft, the propulsion system comprising:
- a gas turbine engine arranged to be powered by a fuel and comprising:
  - a compressor; and
  - at least one variable inlet guide vane—VIGV— through/via which airflow into the compressor passes; and
- a VIGV scheduling manager arranged to:
  - obtain at least one fuel characteristic of the fuel being provided to the gas turbine engine; and
  - make a change to scheduling of the at least one VIGV based on the at least one obtained fuel characteristic.

The at least one obtained fuel characteristic may be or comprise a calorific value of the fuel.

The propulsion system may further comprise at least two fuel tanks containing different fuels such that the fuel supplied to the gas turbine engine can be changed in flight. In such cases, the VIGV scheduling manager may be arranged to obtain at least one characteristic of the fuel currently being provided to the gas turbine engine:
  (i) at regular intervals;
  (ii) each time the fuel or fuel blend supplied to the gas turbine engine is changed; and/or
  (iii) before each change to VIGV scheduling.

The propulsion system may be arranged to perform the method of the first aspect.

According to a third aspect there is provided a method of determining at least one fuel characteristic of a fuel provided to a gas turbine engine of an aircraft, the gas turbine engine forming part of a propulsion system of the aircraft. The method comprises:
  making an operational change to affect operation of the gas turbine engine, the operational change being effected by a controllable component of the propulsion system;
  sensing a response to the operational change; and
  determining the at least one fuel characteristic based on the response to the operational change.

The propulsion system may therefore be used to "perform an experiment" to test the fuel, so allowing one or more fuel characteristics to be determined based on the gas turbine engine's response to the experiment.

Any suitable controllable component of the propulsion system may be used to bring about the operational change. For example:
  the propulsion system may comprise a heat management system. The step of making an operational change may comprise, or consist of, using the heat management system to change the temperature of fuel entering a combustor of the gas turbine engine, for example by adjusting flows through one or more heat exchangers;
  the propulsion system may comprise a fuel management system. The step of making an operational change may comprise, or consist of, changing fuel flow rate and/or fuel blend; and/or
  the propulsion system may comprise one or more Variable Inlet Guide Vanes (VIGVs). The step of making an operational change may comprise, or consist of, moving one or more VIGVs.

The response to the operational change may comprise or consist of at least one of:
  (i) a change in power output from the gas turbine engine (e.g. as indicated by an increase or decrease on shaft speed);
  (ii) a change in fuel degradation or coking;
  (iii) a change in at least one pressure within the engine; and/or
  (iv) a change in at least one temperature within the engine.

The propulsion system may comprise at least one variable inlet guide vane (VIGV). The step of making an operational change may comprise or consist of, changing VIGV scheduling, e.g. by moving a VIGV, or adjusting or cancelling a planned movement of a VIGV.

The response to the operational change in VIGV scheduling may comprise, or consist of, at least one of:
  (i) a change in gas temperature at the entrance to a turbine of the gas turbine engine (e.g. the High Pressure Turbine Rotor Entry Temperature, T41);
  (ii) a change in temperature rise across a combustor of the gas turbine engine (e.g. captured by the T30-T41 relationship, T30 being High Pressure Compressor Outlet Temperature); and
  (iii) a change in the relationship between a compressor exit total pressure—P30—and a turbine rotor entry total pressure—P41.

The propulsion system may comprise a plurality of fuel tanks. In such cases, the step of making an operational change may comprise or consist of one or both of the following:
  (i) changing from which tank fuel is taken; and
  (ii) changing what percentage of fuel is taken from a particular tank (e.g. changing to a different fuel blend).

In such cases, the response to the operational change may comprise or consist of one or more of:
  (i) a change in power output from the gas turbine engine;
  (ii) a change in fuel degradation or coking;
  (iii) a change in contrail formation;
  (iv) a change in the relationship between a compressor exit temperature and a turbine rotor entry temperature;
  (v) a change in the relationship between a compressor exit total pressure and a turbine rotor entry total pressure.

The propulsion system may comprise at least one air-oil heat exchanger. In such cases, the step of making an operational change may comprises changing at least one of air flow rate and oil flow rate through the air-oil heat exchanger. The response to the operational change may comprises a pressure change within a fuel system of the gas turbine engine; for example across a section of a pipe making up a portion of the fuel flow pathway, or across a pump, nozzle, or similar.

The at least one fuel characteristic may be or comprise at least one of the fuel characteristics listed above for the first aspect.

The determined one or more fuel characteristics output by the method of this aspect may then be used in controlling the propulsion system, and/or changing a planned flight profile for a flight using the identified fuel, based on the one or more determined fuel characteristics.

According to a fourth aspect, there is provided a propulsion system for an aircraft, the propulsion system comprising:
  a gas turbine engine;
  a fuel tank arranged to contain a fuel to power the gas turbine engine; and
  a fuel composition tracker.

The fuel composition tracker is arranged to:
  receive information regarding an operational change, the operational change being effected by a controllable component of the propulsion system and arranged to affect operation of the gas turbine engine;
  receive data corresponding to a response to the operational change; and determine one or more fuel characteristics of the fuel arranged to be provided to the gas turbine engine based on the response to the operational change.

The propulsion system may further comprise one or more sensors arranged to sense a response to the operational change. The sensor(s) may be further arranged to provide data regarding the response to the fuel composition tracker.

The one or more sensors may include either or both of a temperature sensor; and a pressure sensor. Multiple temperature and/or pressure sensors may be provided in different locations.

The propulsion system may further comprise one or more heat exchangers (e.g. an air-oil heat exchanger, a fuel-oil heat exchanger, and/or a fuel-air heat exchanger, and optionally a plurality of one kind of heat exchanger). The operational change may comprise changing at least one of air flow rate, fuel flow rate, and oil flow rate through one or more heat exchangers. The propulsion system may further comprise one or more pressure sensors arranged to detect a pressure change within a fuel system of the gas turbine engine which may occur in response to such an operational change; for example a pressure change across a section of a pipe making up a portion of the fuel flow pathway, or across a pump, nozzle, or similar. It will be appreciated that sensing a lack of change in pressure despite a change to one or more heat exchange flows on changing fuel may also be informative, and may allow one or more fuel characteristics to be determined.

The gas turbine engine may comprise:
an engine core comprising a turbine, a compressor, and a core shaft connecting the turbine to the compressor; and
a fan located upstream of the engine core, the fan comprising a plurality of fan blades and being arranged to be driven by an output from the core shaft.

The propulsion system may further comprise a flight profile adjustor arranged to change the planned flight profile based on the one or more fuel characteristics of the fuel.

The propulsion system may further comprise a propulsion system controller arranged to adjust control of the propulsion system based on the one or more fuel characteristics of the fuel.

The propulsion system may be arranged to implement the method of the third aspect.

According to a fifth aspect, there is provided a method of determining at least one fuel characteristic of a fuel provided to a gas turbine engine of an aircraft. The gas turbine engine forms part of a propulsion system of the aircraft and comprises:
a combustor arranged to combust the fuel and having an exit, and wherein a combustor exit temperature—T40—is defined as an average temperature of flow at the combustor exit at cruise conditions;
a turbine comprising a rotor having a leading edge and a trailing edge, and wherein a turbine rotor entry temperature—T41—is defined as an average temperature of flow at the leading edge of the rotor of the turbine at cruise conditions; and
a compressor having an exit, wherein a compressor exit temperature—T30—is defined as an average temperature of flow at the exit from the compressor at cruise conditions.
The method comprises:
changing a fuel supplied to the gas turbine engine; and
determining the at least one fuel characteristic of the fuel based on a change in at least one of T30, T40, and T41.

The one or more fuel characteristics may be determined in terms of a change for the or each fuel characteristic as compared to the previous fuel, and/or as absolute values.

The determination of the at least one fuel characteristic of the fuel may be based on a change in a relationship between T30 and one of T40 and T41. At least two of the temperatures may therefore be sensed and used.

The relationship between the temperatures may be a difference between the temperatures. The difference between T30 and one of T40 and T41 may be indicative of a temperature rise across the combustor.

The propulsion system may comprise at least one variable inlet guide vane—VIGV.

No change to the VIGV position may be made on changing fuel, at least until after the at least one fuel characteristic of the fuel has been determined (or at least until the data necessary for that determination to be made have been captured).

The changing of the fuel supplied to the gas turbine engine may be performed at cruise The gas turbine engine may comprise multiple compressors. In such examples, the compressor exit temperature may be defined as the temperature at the exit from the highest pressure compressor.

The compressor may comprise at least one rotor, each rotor having a leading edge and a trailing edge. The compressor exit temperature may be defined as the temperature at the axial position of the trailing edge of the rearmost rotor of the compressor.

The method may further comprise sensing a response to the change of fuel.

The at least one fuel characteristic may comprise at least one of the fuel characteristics listed above for the first aspect.

According to a sixth aspect, there is provided a method of determining at least one characteristic of a fuel provided to a gas turbine engine of an aircraft. The gas turbine engine forms part of a propulsion system of the aircraft and comprises:
a combustor arranged to combust the fuel and having an exit, and wherein a combustor exit pressure—P40—is defined as the total pressure at the combustor exit at cruise conditions;
a turbine comprising a rotor having a leading edge and a trailing edge, and wherein a turbine rotor entry pressure—P41—is defined as the total pressure at the leading edge of the rotor of the turbine at cruise conditions; and
a compressor having an exit, wherein a compressor exit pressure—P30—is defined as the total pressure at the exit from the compressor at cruise conditions.
The method comprises:
changing a fuel supplied to the gas turbine engine; and
determining the at least one fuel characteristic of the fuel based on a change in at least one of P30, P40, and P41.

The determination may be performed using at least two of the pressures, for example assessing a change in a relationship between P30 and one of P40 and P41.

The selected relationship between the pressures may be a pressure ratio.

Any feature as described with respect to the fifth aspect may apply to this sixth aspect, and, in some cases, the two may be used together—examining both pressures and temperatures so as to determine or verify one or more fuel characteristics.

The gas turbine engine may comprise multiple compressors. In such examples, the compressor exit pressure may be defined as the pressure at the exit from the highest pressure compressor.

The compressor may comprise at least one rotor, each rotor having a leading edge and a trailing edge. The compressor exit pressure may be defined as the pressure at the axial position of the trailing edge of the rearmost rotor of the compressor.

The determined one or more fuel characteristics output by the method of the fifth or sixth aspects may then be used in controlling the propulsion system, and/or changing a planned flight profile, based on the one or more determined fuel characteristics.

According to a seventh aspect, there is provided a propulsion system for an aircraft, the propulsion system comprising:
 a gas turbine engine comprising:
  a combustor arranged to combust the fuel and having an exit, and wherein a combustor exit temperature—T40—is defined as an average temperature of flow at the combustor exit at cruise conditions;
  a turbine comprising a rotor having a leading edge and a trailing edge, and wherein a turbine rotor entry temperature—T41—is defined as an average temperature of flow at the leading edge of the rotor of the turbine at cruise conditions; and
  a compressor having an exit, wherein a compressor exit temperature—T30—is defined as an average temperature of flow at the exit from the compressor at cruise conditions;
 a fuel tank arranged to contain fuel to power the gas turbine engine;
 a fuel manager arranged to change a fuel supplied to the gas turbine engine; and
 a fuel composition determination module arranged to:
  receive data corresponding to a change in at least one of T30, T40 and T41; and
  determine at least one fuel characteristic of the fuel based on the change in the at least one temperature.

The fuel composition determination module may be arranged to receive data corresponding to at least two of the temperatures, and optionally to a change in a relationship between T30 and one of T40 and T41. The determination may be performed based on the change in the temperature relationship.

The relationship between the temperatures may be a difference between the temperatures, the difference being indicative of a temperature rise across the combustor.

The propulsion system may comprise at least two fuel tanks.

The propulsion system may further comprise at least one sensor arranged to provide data corresponding to one or more of T30, T40 and T41.

The propulsion system may be arranged to perform the method of the fifth and/or sixth aspect.

According to an eighth aspect, there is provided a propulsion system for an aircraft, the propulsion system comprising:
 a gas turbine engine comprising:
  a combustor arranged to combust the fuel and having an exit, and wherein a combustor exit pressure—P40—is defined as the total pressure of flow at the combustor exit at cruise conditions;
  a turbine comprising a rotor having a leading edge and a trailing edge, and wherein a turbine rotor entry pressure—P41—is defined as the total pressure of flow at the leading edge of the rotor of the turbine at cruise conditions; and
  a compressor having an exit, wherein a compressor exit pressure—P30—is defined as the total pressure of flow at the exit from the compressor at cruise conditions;
 at fuel tank arranged to contain fuel to power the gas turbine engine;
 a fuel manager arranged to change a fuel supplied to the gas turbine engine; and
 a fuel composition determination module arranged to:
  receive data corresponding to a change in a relationship between P30 and one of P40 and P41; and
  determine at least one fuel characteristic of the fuel based on the change in the pressure relationship.

The fuel composition determination module may be arranged to receive data corresponding to at least two of the pressures, and optionally to a change in a relationship between P30 and one of P40 and P41. The determination may be performed based on the change in the pressure relationship.

The propulsion system may comprise at least two fuel tanks.

The propulsion system may further comprise at least one sensor arranged to provide data corresponding to one or more of P30, P40 and P41.

The propulsion system of the seventh or eighth aspect may comprise a flight profile adjustor arranged to change a planned flight profile for a flight of the aircraft based on the one or more fuel characteristics of the fuel.

The propulsion system of the seventh or eighth aspect may comprise a propulsion system controller arranged to adjust control of the propulsion system based on the one or more fuel characteristics of the fuel.

The propulsion system of the seventh or eighth aspect may be used to implement the method of the fifth and/or sixth aspect.

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high-pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propeller stages may be driven by a gearbox of the type described.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, fuel of a given composition or blend is provided to a combustor, which may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further examples, the engine may be producing between 5% and 8% of available thrust. In yet further examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further examples, the engine may be producing between 6% and 12% of available thrust. In yet further examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further examples, the engine may be producing between 95% and 100% of available thrust. In yet further examples, the engine may be producing 100% of available thrust.

Climb may refer to an operating phase of the engine where the aircraft is being propelled by the thrust produced by the engine. During climb, the engine may be producing between 75% and 100% of available thrust. In further examples, the engine may be producing between 80% and 95% of available thrust. In yet further examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further examples, the engine may be producing between 25% and 40% of available thrust. In yet further examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
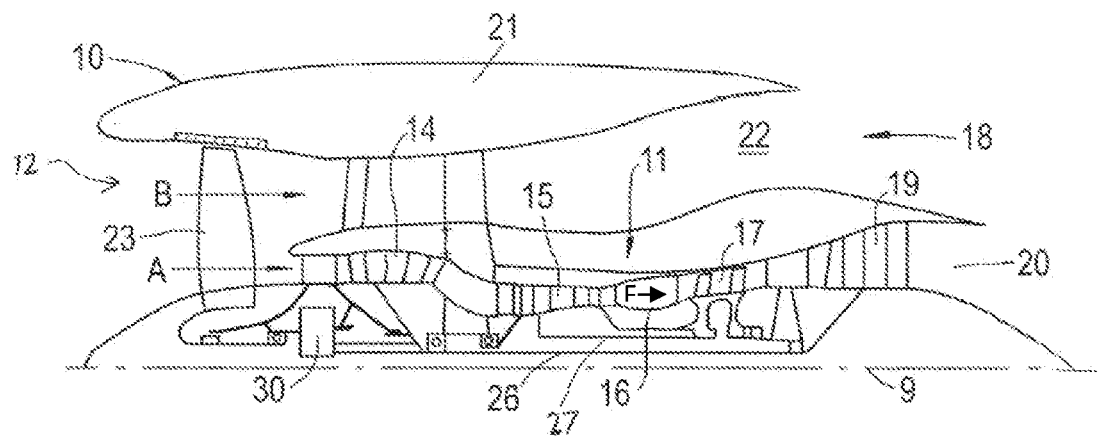
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
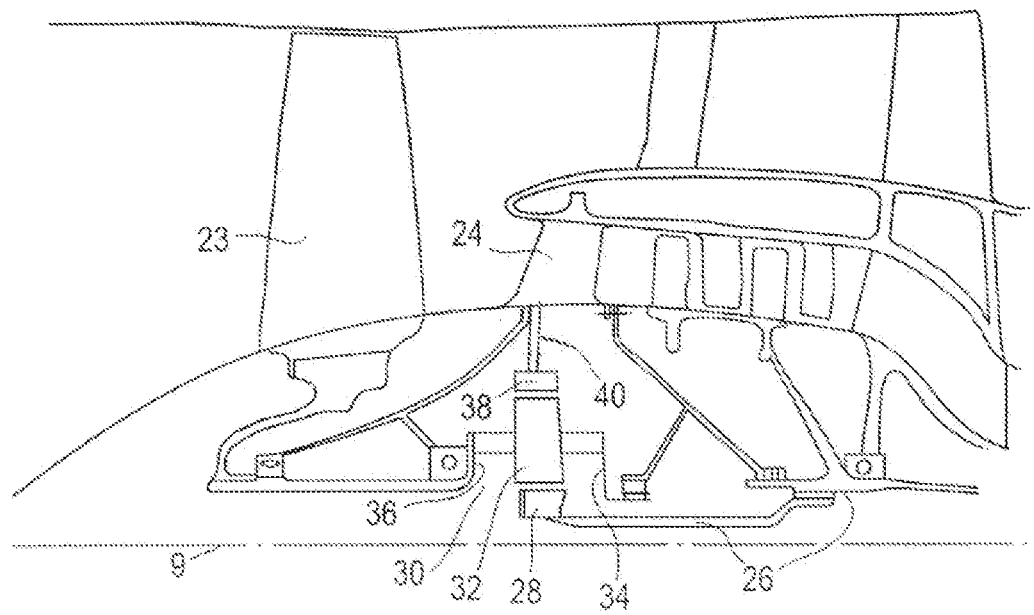
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
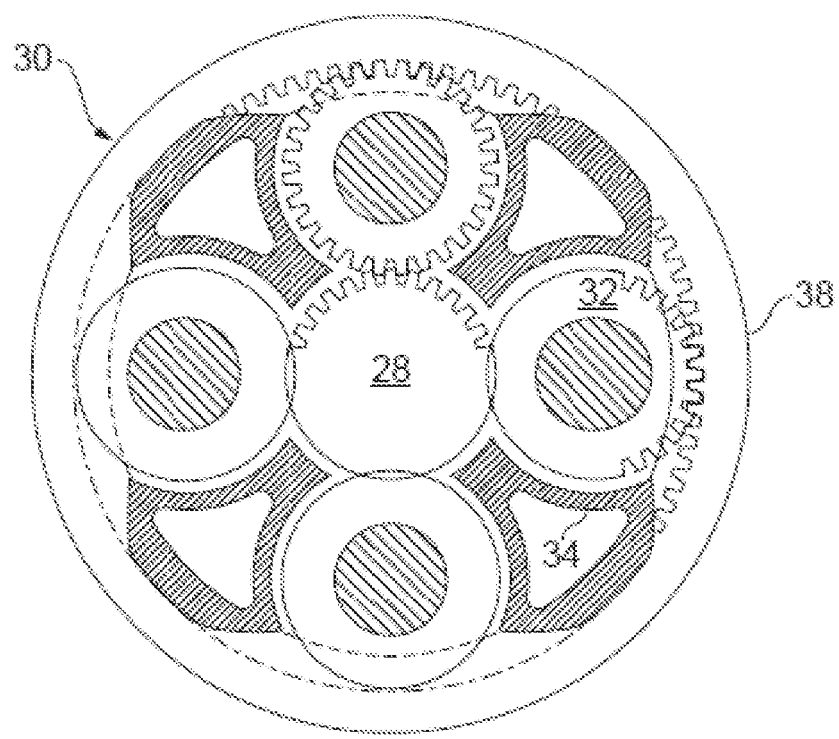
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

ASTM International (ASTM) D7566, *Standard Specification for Aviation Turbine Fuels Containing Synthesized Hydrocarbons* (ASTM 2019c) approves a number of sustainable aviation fuel blends comprising between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher energy density; higher specific energy; higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

As used herein, T30, T40, T41, P30, P40 and P41, and any other numbered pressures and temperatures, are defined using the station numbering listed in standard SAE AS755, in particular:

P30=High Pressure Compressor (HPC) Outlet Total Pressure;
T30=HPC Outlet Temperature;
P40=Combustion Exit Total Pressure;
T40=Combustion Exit Temperature;
P41=High Pressure Turbine (HPT) Rotor Entry Total Pressure;
T41=HPT Rotor Entry Temperature.

Figure 6:
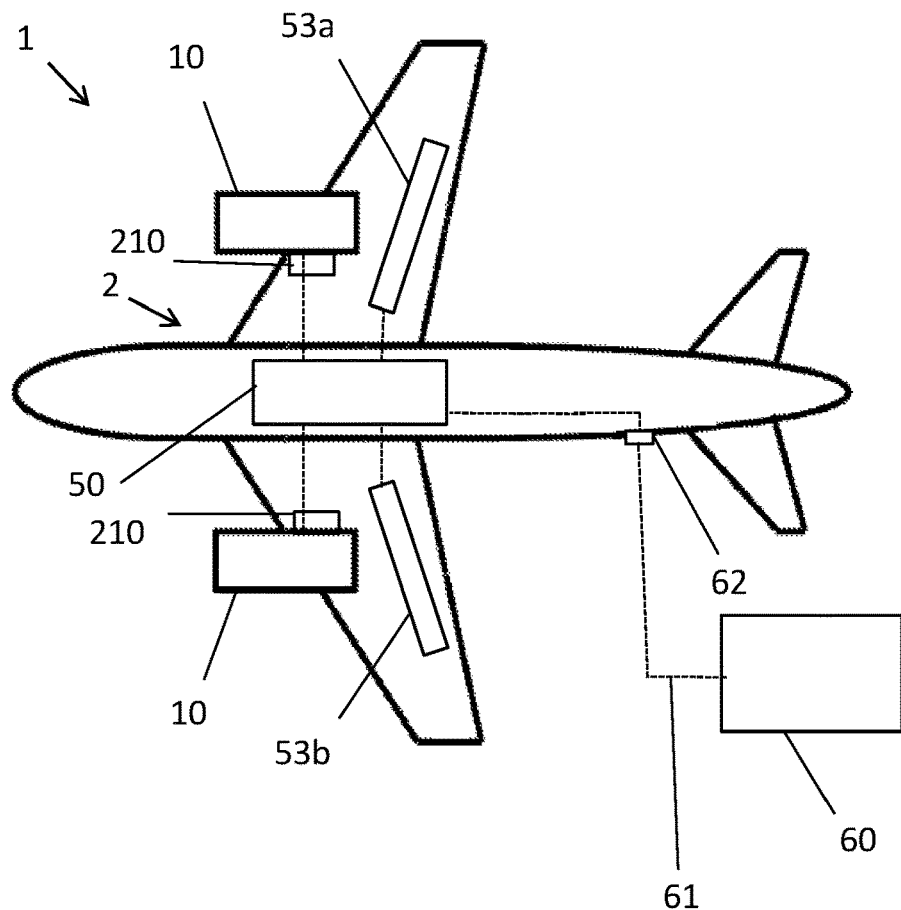
FIG. 6 is a schematic view of an aircraft including a fuel composition determination module.
Figure 7:
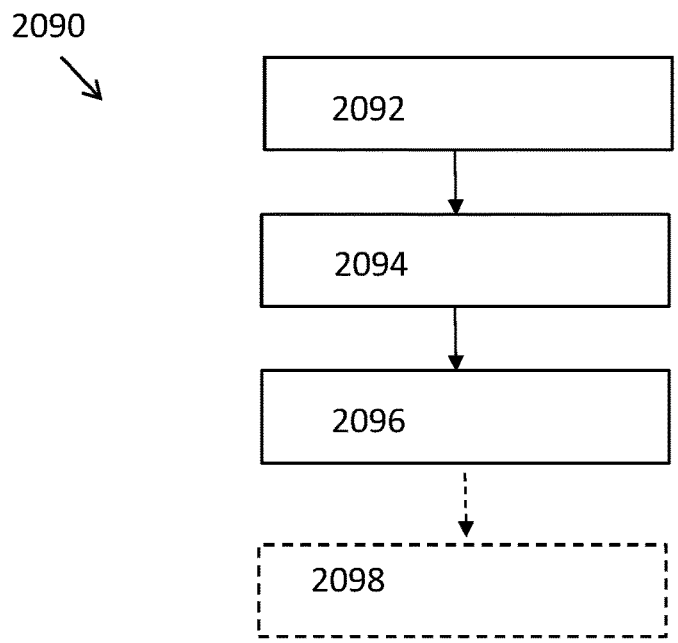
FIG. 7 is a schematic representation of a fuel characteristic determination method.

As depicted in FIG. 6, an aircraft 1 may comprise multiple fuel tanks 50, 53; for example a larger, primary fuel tank 50 located in the aircraft fuselage, and a smaller fuel tank 53*a*, 53*b* located in each wing. In other examples, an aircraft 1 may have only a single fuel tank 50, and/or the wing fuel tanks 53 may be larger than the central fuel tank 50, or no central fuel tank may be provided (with all fuel instead being stored in the aircraft's wings)—it will be appreciated that many different tank layouts are envisaged and that the examples pictured are provided for ease of description and not intended to be limiting.

FIG. 6 shows an aircraft 1 with a propulsion system 2 comprising two gas turbine engines 10. The gas turbine engines 10 are supplied with fuel from a fuel supply system 3 on board the aircraft. The fuel supply system 3 of the example pictured comprises a single fuel source. For the purposes of the present application the term "fuel source" is understood to mean either 1) a single fuel tank or 2) a plurality of fuel tanks which are fluidly interconnected. Each fuel source is arranged to provide a separate source of fuel i.e. the first fuel source may contain a first fuel having a different characteristic or characteristics to a second fuel contained in a second fuel source. First and second fuel sources are therefore not fluidly coupled to each other so as to separate the different fuels (at least under normal running conditions).

In the present example, the first fuel source comprises a centre fuel tank 50, located primarily in the fuselage of the aircraft and a plurality of wing fuel tanks 53*a*, 53*b*, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank and the wing fuel tanks may comprise a plurality of fluidly interconnected fuel tanks.

In another example, the wing fuel tanks 53*a*, 53*b* may not be fluidly connected to the central tank 50, so forming a separate, second fuel source. For balancing purposes, one or more fuel tanks in the port wing may be fluidly connected to one or more fuel tanks in the starboard wing. This may be done either via a centre fuel tank 50 (if that tank does not form part of the other fuel source), or bypassing the centre fuel tank(s), or both (for maximum flexibility and safety).

In another example, the first fuel source comprises wing fuel tanks 53 and a centre fuel tank 50, while a second fuel source comprises a further separate centre fuel tank (not pictured). Fluid interconnection between wing fuel tanks 53 and the centre fuel tank 50 of the first fuel source may be provided for balancing of the aircraft 1.

In some examples, the allocation of fuel tanks 50, 53 available on the aircraft may be constrained such that the first fuel source and the second fuel source are each substantially symmetrical with respect to the aircraft centre line. In cases where an asymmetric fuel tank allocation is permitted, a suitable means of fuel transfer may be provided between fuel tanks of the first fuel source and/or between fuel tanks of the second fuel source such that the position of the aircraft's centre of mass can be maintained within acceptable lateral limits throughout the flight.

An aircraft 1 may be refueled by connecting a fuel storage vessel 60, such as that provided by an airport fuel truck, or a permanent pipeline, to a fuel line connection port 62 of the aircraft, via a fuel line 61. A desired amount of fuel may be transferred from the fuel storage vessel 60 to the one or more tanks 50, 53 of the aircraft 1. Especially in examples with more than one fuel source, in which different tanks 50, 53 are to be filled with different fuels, multiple fuel line connection ports 62 may be provided instead of one, and/or valves may be used to direct fuel appropriately.

Whilst there are standards with which all aviation fuels must be compliant, different aviation fuels have different compositions, for example depending on their source (e.g. different petroleum sources, biofuels or other synthetic aviation fuels (often described as sustainable aviation fuels— SAFs), and/or mixtures of petroleum-based fuels, and other fuels) and on any additives included (e.g. such as antioxidants and metal deactivators, biocides, static reducers, icing inhibitors, corrosion inhibitors) and any impurities. As well as varying between airports and fuel suppliers, even for a given airport or fuel supplier, fuel composition of the available aviation fuel may vary between batches. Further, fuel tanks 50, 53 of aircraft 1 are usually not emptied before being topped up for a subsequent flight, resulting in mixtures of different fuels within the tanks—effectively a fuel with a different composition resulting from the mixture.

The inventors appreciated that, as different fuels can have different properties, whilst still conforming to the standards, knowledge of the fuel(s) available to an aircraft 1 can allow more efficient, tailored, control of the propulsion system 2. For example, a fuel with a higher heat capacity may be used for more engine cooling than a fuel with a lower heat capacity, and a fuel with a higher calorific value may allow a lower flow rate of fuel to be supplied to the combustor for the same power output. Knowledge of the fuel can therefore be used as a tool to improve aircraft performance. In particular, the inventors appreciated that Variable Inlet Guide Vane (VIGV) scheduling may be adjusted based on fuel characteristics.

One or more fuel characteristics of a fuel arranged to be provided to a gas turbine engine 10 of an aircraft 1 may therefore be obtained or otherwise determined and used to influence control of the propulsion system 2; this may be described as making an operational change to the propulsion system 2.

As used herein, the term "fuel characteristics" refers to intrinsic or inherent fuel properties such as fuel composition, not variable properties such as volume or temperature. Examples of fuel characteristics include one or more of:

i. the percentage of sustainable aviation fuel (% SAF, by weight or volume) in the fuel, or an indication that the fuel is a fossil fuel, for example fossil kerosene, or that the fuel is a pure SAF fuel;

ii. parameters of a hydrocarbon distribution of the fuel, such as:
   the aromatic hydrocarbon content of the fuel, and optionally also/alternatively the multi-aromatic hydrocarbon content of the fuel;
   the hydrogen to carbon ratio (H/C) of the fuel;
   % composition information for some or all hydrocarbons present;

iii. the presence or percentage of a particular element or species, such as:
   the percentage of nitrogen-containing species in the fuel;
   the presence or percentage of a tracer species or trace element/substance in the fuel (e.g. a trace substance inherently present in the fuel which may vary between fuels and so be used to identify a fuel, and/or a substance added deliberately to act as a tracer);
   naphthalene content of the fuel;
   sulphur content of the fuel;
   cycloparaffin content of the fuel;
   oxygen content of the fuel;

iv. one or more properties of the fuel in use in a gas turbine engine 10, such as:
   level of non-volatile Particulate Matter (nvPM) emissions or $CO_2$ emissions on combustion (a value may be provided for a specific combustor operating under particular conditions to compare fuels fairly—a measured value may be adjusted accordingly based on combustor properties and conditions);
   level of coking of the fuel;

v. one or more properties of the fuel itself, independent of use in an engine 10 or combustion, such as:
   thermal stability of the fuel (e.g. thermal breakdown temperature); and
   one or more physical properties such as density, viscosity, calorific value, freeze temperature, and/or heat capacity.

For example, calorific value of a fuel may be selected as a fuel characteristic of interest. As used herein, the term "calorific value" denotes the lower heating value (also known as net calorific value) of the fuel, unless otherwise specified. The net calorific value is defined as the amount of heat released by combusting a specified quantity of the fuel, assuming that the latent heat of vaporisation of water in the reaction products is not recovered (i.e. that produced water remains as water vapour after combustion).

Calorific values (also referred to as heating values) of fuels may be directly determined—for example by measuring the energy released when a certain volume or mass of the fuel is combusted in the gas turbine engine 10—or calculated from other fuel parameters; e.g. based on the hydrocarbon distribution of the fuel and the calorific value of each constituent hydrocarbon type (for which a standard value may be looked up). Alternatively, or additionally so as to provide verification, the calorific value may be determined using external data, such as a look-up table for a tracer substance in the fuel, or data encoded in a barcode associated with the fuel, or other stored data.

Figure 4:
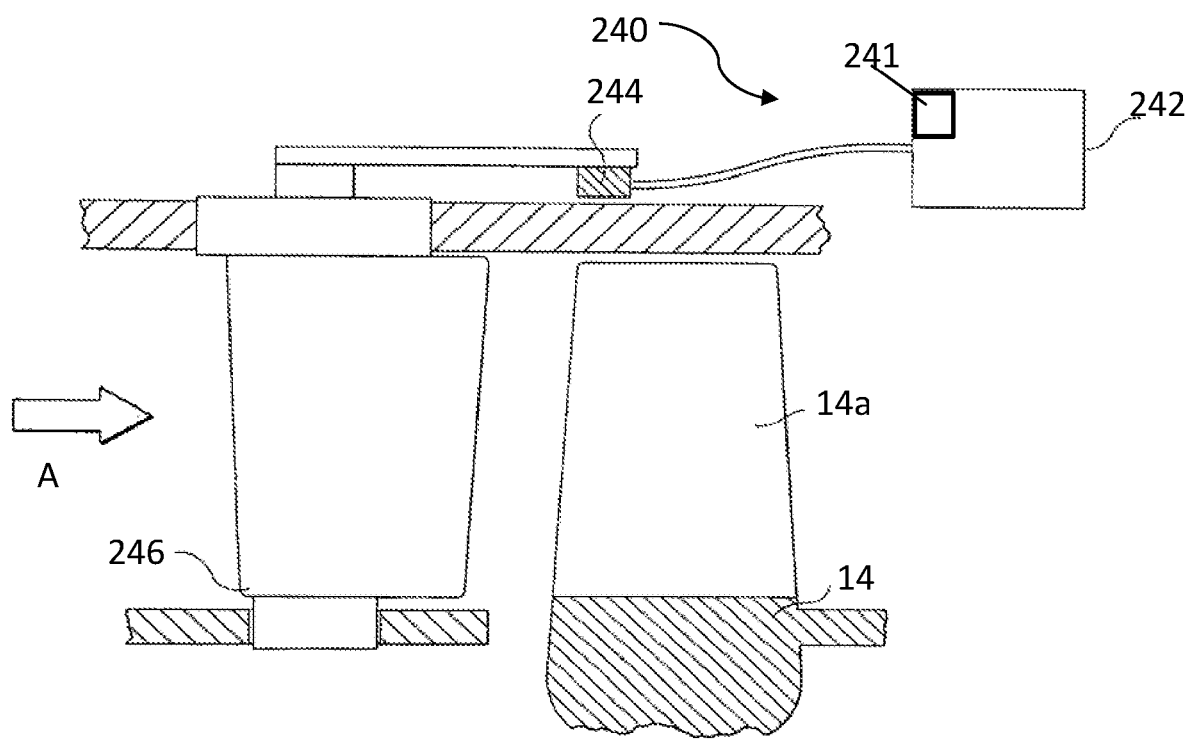
FIG. 4 is a schematic view of VIGVs by a compressor inlet of a gas turbine engine.
Figure 5:
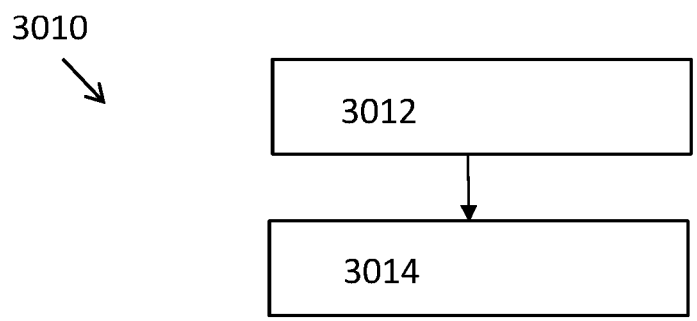
FIG. 5 is a schematic representation of an aircraft propulsion system control method.

The operational change is a change to the current, or intended, operation of the propulsion system 2. In particular, changes to Variable Inlet Guide Vane scheduling may be made, based on the one or more obtained fuel characteristics. For example, a variable inlet guide vane (VIGV) 246, as shown in FIG. 4, may be moved in a direction, and/or by an amount, determined based on the one or more fuel characteristics. Alternatively, a VIGV may be held stationary under a condition/at a time at which it would normally be moved, based on the one or more fuel characteristics being different from those of a standard or previously-used fuel. The operational change may therefore, in some instances, be a decision not to make a change to VIGV scheduling that would normally be made in the circumstances (e.g. a fuel flow rate change or aircraft speed change). Examples of operational changes therefore include adjusting, or cancelling an adjustment to, VIGV positioning.

It will be appreciated that a change in VIGV geometry may generally be triggered by a change in speed of the aircraft 1, a change in temperature at the inlet to a compressor 14, and/or a change in pressure across a compressor 14. The inventors appreciated that VIGV geometry changes may also be appropriate when a fuel with different characteristics is used—as such, when a fuel is changed in-flight (for an aircraft 1 with a plurality of different fuels on board) or between flights, different VIGV scheduling may be appropriate even if all engine control and environmental factors other than the fuel are the same.

For example, for a given gravimetric fuel flow rate and shaft speed, the VIGVs may be opened more widely when using a fuel with a higher % SAF. Opening the VIGVs for a higher % SAF or higher calorific value fuel may do one or more of the following: improve efficiency, reduce T41, increase P30, and/or increase the overall pressure ratio across the compression system.

It will be appreciated that VIGV geometry/opening angle may be measured directly, e.g. using feedback from one or more angle controllers (e.g. the actuator 242 described below), or may be inferred from secondary effects.

Changing VIGV geometry changes the angle of flow of air into the compressor 14—if one or more VIGVs 246 are not adjusted appropriately, the inappropriate flow can result in compressor surge or stall unless remedial action is taken (e.g. opening or closing a bleed valve, and/or making an additional operational change to the engine 10). A compressor stall is a local disruption of the airflow in the compressor. A compressor surge is a stall that results in complete disruption of the airflow through the compressor 14. The severity of a stall ranges from a momentary and insignificant power drop to a complete loss of compression in case of a surge, requiring adjustments to fuel flow to recover normal operation. Monitoring of pressures and flow rates enables detection of when a compressor 14 is approaching a surge point, and corrective action can then be taken (e.g. VIGV changes and/or bleed valve changes).

A compressor 14 will only pump air stably up to a certain engine pressure ratio (the Engine Pressure Ratio (EPR) is the ratio of the turbine discharge pressure divided by the compressor inlet pressure); if the EPR is exceeded, the airflow will become unstable. This occurs at what is known as the surge line on a compressor map. The engine 10 is designed to keep the compressor 14 operating a small distance below the surge line, on an operating line of a compressor map. The distance between the two lines may be referred to as the surge margin. A change in fuel characteristics may raise or lower the operating pressure ratio, so moving the operating line towards or away from the surge line. If the gap between the lines/the surge margin decreases to zero, compressor stall may result.

Modern compressors 14 are designed and controlled, usually by an electronic engine controller (EEC) 42, to avoid or limit stall within an engine's operating range.

FIG. 4 illustrates airflow A, on approach to a compressor 14, and more specifically to the low pressure compressor 14 of the gas turbine engine 10. The compressor 14 comprises a rotor having a plurality of blades 14a extending from a central region and arranged to do work on the airflow therethrough.

In the implementation depicted in FIG. 4, there are a plurality of VIGVs 246 disposed in the working fluid flow path upstream of/at or near an entrance to the compressor 14. The VIGV blade 246 shown is just one of a plurality of VIGVs 246 disposed around the fluid flow path in this example. The VIGVs 246 are evenly spaced around the annular flow path in the example shown, and are pivotable to adjust the angle of the VIGVs relative to the fluid flow A. VIGV arrangements may differ in other examples.

In the example shown in FIG. 4, the plurality of VIGVs 246 are coupled to a ring member 244 that allows the plurality of VIGVs 246 to move in unison. An actuator 242 is operatively coupled with the ring member 244. The actuator 242 is controlled by the engine control system (EEC 42) and moves the ring member 244 the desired amount to effect a change in position of the plurality of VIGVs 246 relative to the fluid flow within the working fluid path. The actuator 242 may also include a position-sensing feature to provide feedback on the actual position of the VIGV 246. In an alternative example, a separate position sensor may be used to provide an output signal indicative of the actual position of the VIGVs 246. It will be appreciated that different control and actuation arrangements may be used in different examples, for example with one or more VIGVs 246 being independently controllable.

A VIGV scheduling manager 240 is used to adjust VIGV scheduling based on the one or more fuel characteristics. One or more fuel characteristics are therefore obtained for the fuel in order to perform the scheduling adjustment.

For a given fuel flow rate, fuel characteristics such as the calorific value of the fuel have an effect on turbine inlet temperature, and thereby on temperatures and pressures and on the engine pressure and temperature ratios. Calorific value may therefore be selected as a, or the, fuel characteristic on which changes to VIGV scheduling are based.

In some examples, such as that shown in FIG. 6, the aircraft 1 may have only a single fuel tank 50, and/or may have multiple fuel tanks 50, 53 which each contain the same fuel, and/or are fluidly linked, or fluidly connected to the gas turbine engine 10, such that only a single fuel type is supplied to the gas turbine engine 10 between refuelling events—i.e. the fuel characteristics may remain constant throughout a flight, and only change between flights.

In other examples, however, the aircraft 1 may have a plurality of fluidly separate fuel tanks 50, 53 which contain fuels of different compositions, and the propulsion system 2 may comprise an adjustable fuel delivery system, allowing a selection to be made of which tank(s) 50, 53, and therefore what fuel/fuel blend, to use. In such implementations, the fuel characteristics may vary over the course of a flight, with a specific fuel or fuel blend being provided to the gas turbine engine 10. Fuel characteristics for the multiple different fuels in each tank 50, 53 may therefore be determined, and/or fuel characteristics of a fuel/fuel blend currently being supplied to the gas turbine engine 10 may be directly detected or otherwise determined.

Fuel characteristics, such as calorific values, may therefore be obtained in various different ways. For example:

- a barcode of a fuel to be added to a fuel tank 50, 53 of the aircraft 1 may be scanned to read data of the fuel, or a tracer substance (e.g. a dye) identified and fuel properties looked up based on that tracer;
- data may be manually entered, or transmitted to the aircraft 1 for storage;
- a fuel sample may be extracted for ground-side analysis prior to take-off;
- fuel properties may be inferred from measurements of the propulsion system 2 activity during one or more periods of aircraft operation, e.g. engine start-up, taxi, take-off, climb and/or cruise; and/or
- one or more fuel properties may be detected onboard, optionally in-flight, for example using in-line sensors and/or other measurements.

Fuel characteristics may be detected in various ways, both direct (e.g. from sensor data corresponding to the fuel characteristic in question) and indirect (e.g. by inference or calculation from other characteristics or measurements, or by reference to data for a specific detected tracer in the fuel). The characteristics may be determined as relative values as compared to another fuel, or as absolute values. For example, one or more of the following detection methods may be used:

- The aromatic or cycloparaffin content of the fuel can be determined based on measurements of the swell of a sensor component made from a seal material such as a nitrile seal material.
- Trace substances or species, either present naturally in the fuel or added to act as a tracer, may be used to determine fuel characteristics such as the percentage of sustainable aviation fuel in the fuel or whether the fuel is kerosene.
- Measurements of the vibrational mode of a piezoelectric crystal exposed to the fuel may be used as the basis for the determination of various fuel characteristics including the aromatic content of the fuel, the oxygen content of the fuel, and the thermal stability or the coking level of the fuel—for example by measuring the build-up of surface deposits on the piezoelectric crystal which will result in a change in vibrational mode.
- Various fuel characteristics may be determined by collecting performance parameters of the gas turbine engine 10 during a first period of operation (such as during take-off), and optionally also during a second period of operation (e.g. during cruise), and comparing these collected parameters to expected values if using fuel of known properties.
- Various fuel characteristics including the aromatic hydrocarbon content of the fuel can be determined based on sensor measurements of the presence, absence, or degree of formation of a contrail by the gas turbine 10 during its operation.
- Fuel characteristics including the aromatic hydrocarbon content can be determined based on a UV-Vis spectroscopy measurement performed on the fuel.
- Various fuel characteristics including the sulphur content, naphthalene content, aromatic hydrogen content and hydrogen to carbon ratio may be determined by measurement of substances present in the exhaust gases emitted by the gas turbine engine 10 during its use.
- Calorific value of the fuel may be determined in operation of the aircraft 1 based on measurements taken as the fuel is being burned—for example using fuel flow rate and shaft speed or change in temperature across the combustor 16.

Various fuel characteristics may be determined by making an operational change arranged to affect operation of the gas turbine engine 10, sensing a response to the operational change; and determining the one or more fuel characteristics of the fuel based on the response to the operational change.

Various fuel characteristics may be determined in relation to fuel characteristics of a first fuel by changing a fuel supplied to the gas turbine engine 10 from the first fuel to a second fuel, and determining the one or more fuel characteristics of the second fuel based on a change in a relationship between T30 and one of T40 and T41 (the relationship being indicative of the temperature rise across the combustor 16). The characteristics may be determined as relative values as compared to the first fuel, or as absolute values, e.g. by reference to known values for the first fuel.

In examples in which a fuel cannot be changed in flight, the VIGV scheduling manager 240 may be provided with one list of one or more fuel characteristics which list is then used throughout the flight/until the next refuelling event. The one or more fuel characteristics are therefore obtained just once per flight or refuelling event, and used multiple times throughout the flight, whenever a movement of VIGVs 246 is planned or considered.

In examples in which a fuel or fuel blend can be changed in flight, the one or more fuel characteristics of fuel fed to the combustor 16 may change during the flight as the fuel or fuel blend is changed, so values may be obtained multiple times during a flight. For example, the VIGV scheduling manager 240 may obtain values for the fuel characteristics (i) at regular intervals (optionally with the frequency varying depending on stage of flight, e.g. less frequently during cruise than during climb); (ii) each time the fuel or fuel blend supplied to the gas turbine engine 10 is changed; and/or (iii) before each (potential) change to VIGV scheduling.

The VIGV scheduling manager 240 may obtain data of a percentage mix of one or more different fuels being fed to the gas turbine engine 10 at a certain time, look up fuel characteristic data for the/each fuel in data storage, and determine/calculate fuel characteristics for the fuel/blend accordingly. In some examples, no in-flight detection or analysis may be performed, and instead pre-supplied data may be relied upon. In other examples, physical and/or chemical detection (either of the fuel characteristic(s) directly, or of one or more fuel properties or engine properties from which the fuel characteristic(s) can be derived) may be used instead of, or in addition to, data retrieval from storage.

The VIGV scheduling manager 240 is therefore arranged to obtain one or more characteristics of the fuel currently being provided to the gas turbine engine 10 in any suitable way.

Once one or more fuel characteristics have been determined for fuel currently being provided to the gas turbine engine 10, control of the propulsion system 2, and in particular VIGV scheduling, may be adjusted based on the determined fuel characteristic(s). It will be appreciated that, for many current aircraft 1, VIGV scheduling changes may only be applicable to geared gas turbine engines 10.

For example, for a 2% increase in the calorific value of a fuel being fed to the gas turbine engine 10, the VIGVs may be opened at take-off by approximately 2% of their range (assuming a full movement/rotation range of 40°). For example, for a given aircraft 1 with a usual VIGV angle for Jet A, the VIGVs may be opened beyond that usual angle by 5% of their range (i.e. moved by 2°) if a fuel with a calorific value 5% greater than that of Jet-A is used. This VIGV scheduling change may facilitate maintenance of a more constant turbine gas temperature (e.g. T41). A corresponding change may be made at cruise, although the magnitude of the position change is likely to be lower. It will be appreciated that VIGV scheduling changes may be tailored to a particular aircraft 1, and/or to a particular part of the flight envelope (e.g. take-off or cruise), so as to achieve a certain turbine gas temperature (e.g. T41), or a certain temperature rise across the combustor 16 (e.g. T30-T41 relationship).

By way of further example, for a 30% increase in heat capacity, the VIGVs 246 may be opened by an additional 0.5% at take-off, up to a limit of 5% of their full range. This may be scaled linearly for a smaller (or larger) change in heat capacity. A corresponding change may be made at cruise, although the magnitude of the change is likely to be lower. Similarly, a 30% decrease in heat capacity may prompt a 0.5% closing of the VIGVs 246 at take-off, up to a limit of 5% of their full range.

Additional data may be used in conjunction with the determined fuel characteristics to adjust control of the VIGVs 246. For example, the approach being described may comprise receiving data of operational parameters such as speed of the aircraft, air and/or fuel flow rate, temperature at the inlet to a compressor 14, and/or pressure across a compressor 14, fuel temperature data and/or environmental parameters such as altitude. These received data (e.g. operational and/or environmental parameters) may be used to make or influence changes in VIGV scheduling. For example, if fuel temperature were higher on entry to the combustor 16, for every 50 degree increase in fuel temperature at take-off, the VIGVs 246 may be opened by 1%

A propulsion system 2 for an aircraft 1 may therefore comprise one or more variable inlet guide vanes—VIGVs—246 through/past which airflow into the compressor 14 passes; and a VIGV scheduling manager 240 arranged to obtain one or more characteristics of the fuel being provided to the gas turbine engine 10; and make a change to scheduling of the one or more VIGVs 246 based on the one or more obtained characteristics of the fuel.

The VIGV scheduling manager 240 may determine a desired change to VIGV scheduling based on the one or more obtained fuel characteristics and control an actuator 242 so as to move the one or more VIGVs 246 accordingly.

In the implementation shown in FIG. 4, a separate VIGV scheduling manager 240 is provided for each gas turbine engine 10. In other implementations, only a single VIGV scheduling manager 240 may be provided, and may control VIGV scheduling for both (or all) engines 10.

The VIGV scheduling manager 240 of the example shown also includes a receiver 241 arranged to receive data relating to fuel composition and/or requests for VIGV scheduling changes. The determination of a desired VIGV scheduling change may therefore be performed by the VIGV scheduling manager 240 itself, or the VIGV scheduling manager 240 may implement a change determined by another entity, depending on the implementation.

A fuel composition tracker 202 may be used to record and store fuel composition data, and optionally also to receive sensor data (and optionally other data) and to calculate fuel characteristics based on that data. The VIGV scheduling manager 240 may be provided as part of the same entity, or may obtain data from the fuel composition tracker 202.

The fuel composition tracker 202 of the example being described comprises memory 202a (which may also be referred to as computational storage) arranged to store the current fuel characteristic data, and processing circuitry 202c arranged to calculate updated values for the one or more fuel characteristics of the fuel in the fuel tank 50, 53 after refuelling. The calculated values may then replace the previously-stored fuel characteristic data in the memory, and/or may be time- and/or date-stamped and added to the memory. A log of fuel characteristic data with time may therefore be assembled.

The fuel composition tracker 202 of the example shown also includes a receiver 202b arranged to receive data from which fuel characteristics may be calculated, and/or the fuel characteristics themselves, and/or requests for fuel composition information. The fuel composition tracker 202 of the example shown forms a part of, or is in communication with, an electronic engine controller (EEC) 42. The EEC 42 may be arranged to issue propulsion system control commands based on the calculated fuel characteristics. It will be appreciated that an EEC 42 may be provided for each gas turbine engine 10 of the aircraft 1, or a single EEC 42 may control both, or all, engines 10. Further, the role played by the EEC for the fuel composition tracker 202 may be just a small part of the functionality of the EEC. Indeed, the fuel composition tracker 202 may be provided by the EEC, or may comprise an EEC module distinct from the engine's EEC 42 in various implementations. In alternative examples, the fuel composition tracker 202 may not comprise any engine control functionality, and may instead simply supply fuel composition data on demand, to be used as appropriate by another system. Optionally, the fuel composition tracker 202 may supply a proposed change in engine control functionality for approval by a pilot (or other authority); the pilot may then implement the proposed change directly, or approve or reject the automatic making of the proposed change.

The propulsion system 2 may therefore include an electronic engine controller 42 arranged to issue propulsion system control commands based on the determined fuel characteristics, the fuel characteristics being determined based on data provided by the fuel composition tracker 202 and/or the VIGV scheduling manager 240 and optionally other data. The VIGV scheduling manager 240 of the example shown may be a part of, or be in communication with, the electronic engine controller (EEC) 42 which is arranged to issue propulsion system control commands based on the fuel characteristics. It will be appreciated that the role played by the EEC 42 for the VIGV scheduling manager 240 may be just a small part of the functionality of the EEC. Indeed, the VIGV scheduling manager 240 may be provided by the EEC 42, or may comprise an EEC module distinct from the engine's EEC 42 in various implementations. In alternative examples, the VIGV scheduling manager 240 may not comprise any engine control functionality, and may instead provide VIGV scheduling data on demand, to be used as appropriate by another system. The fuel composition tracker 202 and/or the VIGV scheduling manager 240 may be provided as a separate unit built into the propulsion system 2, and/or as software and/or hardware incorporated into other aircraft control systems such as the EEC 42. Fuel composition tracking abilities may be provided as part of the same unit or package as engine control functionality.

The EEC 42, which may also be thought of as a propulsion system controller, may make changes to the propulsion system 2, and in particular to VIGV scheduling, directly, or may provide a notification to the pilot (or other authority) recommending the change, for approval. In some examples, the same propulsion system controller 42 may automatically make some changes, and request others, depending on the nature of the change. In some examples, the same implementation may include automatically making some changes, and requesting others, depending on the nature of the change. In particular, changes which are "transparent" to the pilot—such as internal changes within engine flows which do not affect engine power output and would not be noticed by a pilot—may be made automatically, whereas any changes which the pilot would notice may be notified to the pilot (i.e. a notification appearing that the change will happen unless the pilot directs otherwise) or suggested to the pilot (i.e. the change will not happen without positive input from the pilot). In implementations in which a notification or suggestion is provided to a pilot, this may be provided on a cockpit display of the aircraft and/or as an audible alarm, and/or sent to a separate device such as a portable tablet or other computing device.

A method 3010 of controlling a propulsion system 2 of an aircraft 1 may therefore be implemented, the propulsion system 2 comprising a gas turbine engine 10 with one or more VIGVs 246 at or near the entrance to a compressor 14 of the gas turbine engine 10.

The method 3010 comprises obtaining 3012 one or more characteristics of the fuel being provided to the gas turbine engine 10. The obtaining 3012 may be performed by retrieving data from storage and/or by physically and/or chemically detecting one or more fuel properties. The obtaining step 3012 may be performed just once, for example on refuelling or at the start of a flight. Particularly in examples in which a fuel or fuel blend can be changed in flight, the obtaining step 3012 may be performed repeatedly over the course of a flight.

The method 3010 comprises making 3014 a change to scheduling of the one or more VIGVs 246 based on the one or more obtained characteristics of the fuel, for example by moving a VIGV by a certain amount (e.g. a rotation of a certain angle), in a certain direction.

In implementations with a variable fuel in flight, the obtaining step 3012 and the step 3014 of making a change based on the obtained data may be repeated together each time a change in VIGV position is considered, or the obtaining step 3012 may be performed at intervals. In implementations with a single, constant fuel in flight, the obtaining step 3012 may be performed only once and the step 3014 of making a change may be performed multiple times over the course of a flight, using the same obtained data. Alternatively, the obtaining step 3012 may again be performed at intervals, e.g. for verification.

As described above, the inventors appreciated that knowledge of the fuel(s) available to an aircraft 1 can allow more efficient, tailored, control of the propulsion system 2—such as for the VIGV scheduling control described herein. In some cases, fuel characteristics may be supplied to the aircraft 1 by a third party, e.g. by a supplier on refuelling. However, in other cases, prior knowledge of fuel characteristics may not be available. One or more fuel characteristics of a fuel arranged to be provided to a gas turbine engine 10 of an aircraft 1 may therefore be determined on board the aircraft 1, and optionally then used to influence control of the propulsion system 2.

In the examples described below, the aircraft's propulsion system 2 is used to perform an "experiment" so as to determine, or provide data useful in the determination of, one or more fuel characteristics. This performance of an "experiment" comprises making an operational change to the propulsion system 2 and determining what effect that operational change has—one or more fuel characteristics can then be determined from the response to the known operational change. The fuel characteristics may include one or more of those listed above.

More specifically, an operational change is made, the operational change being effected by a controllable component of the propulsion system 2. The operational change is selected to affect operation of the gas turbine engine 10 in a manner dependent on at least one fuel characteristic.

The operational change is a change to the current, or intended, operation of the propulsion system 2. For example, a variable inlet guide vane (VIGV) 246 may be moved, and a response to that movement detected. Alternatively, a VIGV may be held stationary under a condition/at a time at which it would normally be moved, and a response to that change from the standard operational procedure may be monitored. The operational change may therefore, in some instances, be a decision not to make a change to operation that would normally be made in the circumstances. It will be appreciated that this may be thought of as the inverse of the approach 3012, 3014 described above—rather than obtaining one or more fuel characteristics and changing VIGV scheduling based on those fuel characteristics to achieve a desired response, a change is made to VIGV scheduling and one or more fuel characteristics are inferred or determined from the response to that scheduling change.

For example, VIGVs 246 may be moved so as to maintain a constant T41 or T30-T41 relationship on changing fuel (e.g. T41 minus T30 or T40 minus T30, indicative of a combustor temperature rise); the movement required to maintain the constant temperature or temperature relationship may then be used to identify a change in calorific value between the initial fuel (prior to the change in fuel fed to the gas turbine engine 10) and the new fuel.

Assuming that mass fuel flow is held constant on changing fuel, an increase in temperature rise across the combustor 16 (T40-T30) is likely to be seen on changing to a fuel with a higher calorific value if no VIGV scheduling changes are made. If a decision is made not to change VIGV scheduling on changing fuel/on seeing temperature rise start to increase, the change in the temperature rise across the combustor 16 may be used to calculate the change in fuel calorific value. For current SAFs and SAF-blends, a change of temperature rise of at least 2% or 3% may be seen as compared to kerosene, which may correspond to a change of more than 30° C., or more than 50° C.

If low pressure shaft speed/thrust is held constant instead of mass flow of fuel, a rise in T41 may still be observed due to the higher calorific value of the new fuel if no VIGV scheduling changes are made, and the size of that change may be used to infer the change in calorific value. A change of around 3° C. may be observed for each 3% change in fuel calorific value.

As described above, a compressor 14 will only pump air stably up to a certain engine pressure ratio (the Engine Pressure Ratio (EPR) is the ratio of the turbine discharge pressure (P42) divided by the compressor inlet pressure (P26)); if the EPR is exceeded, the airflow will become unstable. This occurs at what is known as the surge line on a compressor map. The engine is designed to keep the compressor operating a small distance below the surge line, on an operating line of a compressor map. The distance between the two lines may be referred to as the surge margin. A change in fuel characteristics may raise or lower the operating pressure ratio, so moving the operating line towards or away from the surge line. If the gap between the lines/the surge margin decreases to zero, compressor stall may result.

Modern compressors 14 are designed and controlled, usually by the EEC 42, to avoid or limit stall within an engine's operating range. Whilst compressor surge is generally to be avoided completely, the precise point at which a minor stall occurs for a given fuel flow rate may be used to infer fuel characteristics. The compressor 14 will then recover to normal flow once the engine pressure ratio reduces to a level at which the compressor can sustain stable airflow.

For example, for a given fuel flow rate, the calorific value of the fuel has an effect on turbine inlet temperature, and thereby on the engine pressure and temperature ratios. Monitoring how close the compressor 14 comes to stall after changing the VIGV geometry, or after changing fuel and not changing the VIGV geometry, may therefore allow a calorific value or other parameter of the fuel to be determined or inferred.

Whilst airflow patterns may be measured in some implementations, VIGV angles, and secondary effects such as temperature and pressure changes may be easier to measure directly. For example, as well as changes in the T30-T41 relationship, opening VIGVs 246 often results in a higher P30 and an increase in overall pressure ratio across the compression system. Further, VIGV position information may be directly available from one or more actuators 242.

Other examples of operational changes, aside from VIGV scheduling changes, may include adjusting, or cancelling an adjustment to one or more of:

fuel composition (e.g. varying a % mixture of fuels from two different sources/tanks 50, 53);
fuel temperature (e.g. of fuel entering the combustor 16) or one or more other features of heat management;
engine thrust;
fuel flow rate;
fuel pump spill ratio; and
water injection into the combustor 16.

For example, if a change in fuel is made whilst the gas turbine 10 is held to operate at a fixed speed/thrust and the fuel mass flow has dropped but the volumetric flow has not, then the new fuel can be inferred to have a lower density, and the density may be calculated accordingly. It will be appreciated that, for many current flow rate sensors, a change in flow rate may be more accurate than an absolute value, so allowing density to be calculated more accurately on changing fuel, by reference to values for the first fuel, than might be possible using the sensor flow rate values for one fuel alone.

By way of further example, if air flow and/or oil flow to one or more air-oil heat exchangers 118 is reduced on changing fuel and no increase in pressure (or a smaller pressure increase than would be expected for the original fuel) is seen across all or a part of the fuel system 3 and/or if no fuel temperature change (or a smaller fuel temperature change than would be expected for the original fuel) is seen, the new fuel may be inferred to have a better heat capacity and/or thermal stability (the lack of pressure increase indicating a lack of carbon deposit formation). (The fuel system 3 comprises the fuel path between the tanks 50, 53 and the engine(s) 10, including all pipelines and components along that route.) It will be appreciated that reducing air flow to the air-oil heat exchanger 118 (which may be referred to as an air cooler) would result in less cooling of the oil and resultantly less heat removal from the engine 10, and so a warmer engine 10 and more heat in the fuel, and that reducing oil flow to the air-oil heat exchanger 118 may cause more hot oil to be directed to a fuel-oil heat exchanger (not shown), so directly adding heat to the fuel.

By way of further example, in a gas turbine engine 10 comprising a combustor 16 with multiple different combustion modes, a change in nvPM generation may be monitored when a change is made between combustor modes—the observed change in nvPM generation may be used to determine one or more fuel characteristics, e.g. SAF percentage or nvPM generation potential itself.

Multiple operational changes may be made simultaneously, or sequentially, and the behaviour of the propulsion system 2 may be monitored over a period of time, gathering data to determine the one or more fuel characteristics of interest.

In some examples, the aircraft 1 may have only a single fuel tank 50, and/or may have multiple fuel tanks 50, 53 which each contain the same fuel, and/or are fluidly linked, or fluidly connected to the gas turbine engine 10, such that only a single fuel type is supplied to the gas turbine engine 10 between refuelling events—i.e. the fuel characteristics may remain constant throughout a flight.

In other examples, the aircraft 1 may have a plurality of fuel tanks 50, 53 which contain fuels of different compositions, and the propulsion system 2 may comprise an adjustable fuel delivery system, allowing a selection to be made of which tank(s) 50, 53, and therefore what fuel/fuel blend, to use. In such examples, the fuel characteristics may vary over the course of a flight, and a specific fuel or fuel blend may be selected to improve operation at certain flight stages or in certain external conditions. In such examples, the same operational change may be performed at multiple different times, with an active fuel management system 214 being arranged to change the fuel, or fuel blend, in between. Fuel characteristics for the multiple different fuels on board may therefore be determined.

For example, in implementations in which the fuel temperature on entry to the combustor 16 is changed, a response to this operational change may be or comprise (i) a change in power output from the gas turbine engine 10; or (ii) a change in fuel degradation or coking.

Once one or more fuel characteristics have been determined for fuel currently being provided to the gas turbine engine 10, control of the propulsion system 2 may be adjusted based on the determined fuel characteristics.

Additional data may be used in conjunction with the determined fuel characteristics to adjust control of the propulsion system 2. For example, the method may comprise receiving data of current conditions around the aircraft 1 (either from a provider, such as a third-party weather-monitoring company, or from on-board detectors). These received data (e.g. weather data, temperature, humidity, presence of a contrail, etc.) may be used to make or influence changes in propulsion system control. Instead of, or as well as, using "live" or near-live weather data, forecast weather data for the aircraft's route may also be used to estimate current conditions.

By way of further example, in implementations in which the propulsion system 2 comprises a plurality of non-fluidly-linked fuel tanks 50, 53, the making an operational change may comprise or consist of changing from which tank 50, 53 fuel is taken, or changing what percentage of fuel is taken from a particular tank, thereby changing the fuel composition.

The response to a change in fuel composition may consist of or comprise one or more of the below examples:
  (i) a change in power output from the gas turbine engine 10;
  (ii) a change in fuel degradation or coking;
  (iii) a change in contrail formation (contrails may be detected visually and/or by an infra-red sensor, or may be inferred from measurements of temperature, pressure, and humidity, amongst other variables, for example);
  (iv) a change in the Engine Pressure Ratio;
  (v) a change in the relationship between a compressor exit temperature—T30—and a turbine rotor entry temperature—T41;
  (vi) a change in the relationship between a compressor exit total pressure—P30—and a turbine rotor entry total pressure—P41.

In the examples being described, a turbine 17 of the engine 10 comprises a rotor having a leading edge and a trailing edge. A turbine rotor entry temperature—T41—is defined as an average temperature of airflow at the leading edge of the rotor of the turbine 17 at cruise conditions. Similarly, a turbine rotor entry pressure—P41—is defined as the total pressure of airflow at the leading edge of the rotor of the turbine 17 at cruise conditions.

The engine 10 also comprises a compressor 15 having an exit, and a compressor exit temperature—T30—is defined as an average temperature of airflow at the exit from the compressor 15 at cruise conditions. Similarly, a compressor exit pressure—P30—is defined as the total pressure of airflow at the exit from the compressor 15 at cruise conditions. In some examples, the gas turbine engine 10 comprises multiple compressors; the compressor exit temperature or pressure may be defined as the temperature or pressure at the exit from the highest pressure compressor 15. The compressor 15 may comprise one or more rotors each having a leading edge and a trailing edge; the compressor exit temperature or pressure may be defined as the temperature or pressure at the axial position of the trailing edge of the rearmost rotor of the compressor.

Between station 40 (combustor exit) and station 41 (inlet to the high pressure turbine 17) there is generally provided a set of nozzle guide vanes that can be moved to modify the flow into the rotating turbine 17; these are often described as variable inlet guide vanes—VIGVs 246—as described above.

Once one or more fuel characteristics have been determined for fuel currently being provided to the gas turbine engine, control of the propulsion system 2 may be adjusted based on the determined fuel characteristics.

Additionally or alternatively, a planned flight profile may be changed based on the one or more determined fuel characteristics.

As used herein, the term "flight profile" refers to the operational characteristics (e.g. height/altitude, power setting, flight path angle, airspeed, and the like) of an aircraft 1 as it flies along a flight track, and also to the trajectory/flight track (route) itself. Changes of route are therefore included in the term "flight profile" as used herein.

Additional data may be used in conjunction with the determined fuel characteristics to adjust control of the propulsion system 2 and/or changes to the flight profile, as described above with respect to control of the propulsion system 2.

Once the one or more fuel characteristics of the resultant fuel in the fuel tank 50, 53 after refuelling have been determined, the propulsion system 2 can be controlled based on the calculated fuel characteristics.

For Example:
An operating parameter of a heat management system of the aircraft (e.g. a fuel-oil heat exchanger or an air-oil heat exchanger 118) may be changed, or the temperature of fuel supplied to the combustor 16 of the engine 10 can be changed.

When more than one fuel is stored onboard an aircraft 1, a selection of which fuel to use for which operations (e.g. for ground-based operations as opposed to flight, for low-temperature start-up, or for operations with different thrust demands) or at what time during a flight may be made based on fuel characteristics such as % SAF, nvPM generation potential, viscosity, and calorific value. A fuel delivery system may therefore be controlled appropriately based on the fuel characteristics.

One or more flight control surfaces of the aircraft 1 may be adjusted so as to change route and/or altitude based on knowledge of the fuel.

The spill percentage of a fuel pump (i.e. the proportion of pumped fuel recirculated instead of being passed to the combustor) may be changed, e.g. based on the % SAF of the fuel. The pump and/or one or more valves may therefore be controlled appropriately based on the fuel characteristics.

Changes to the scheduling of variable-inlet guide vanes (VIGVs 246) may be made based on fuel characteristics. The VIGVs 246 may therefore be moved, or a movement of the VIGVs be cancelled, as appropriate based on the fuel characteristics.

A propulsion system 2 for an aircraft 1 may therefore comprise a fuel composition tracker 202 arranged to record and store fuel composition data, and optionally also to receive data of an operational change and measurement data relating to a response to the operational change and to calculate one or more fuel characteristics based on that data (and optionally also based on other data, such as measurement data relating to responses to one or more other operational changes, or reference tables).

The fuel composition tracker 202 may be provided as a separate fuel composition tracking unit built into the propulsion system 2, and/or as software and/or hardware incorporated into the pre-existing aircraft control systems.

Data from the fuel composition tracker 202 may be used to adjust control of the propulsion system 2, based on the one or more fuel characteristics.

Figure 8:
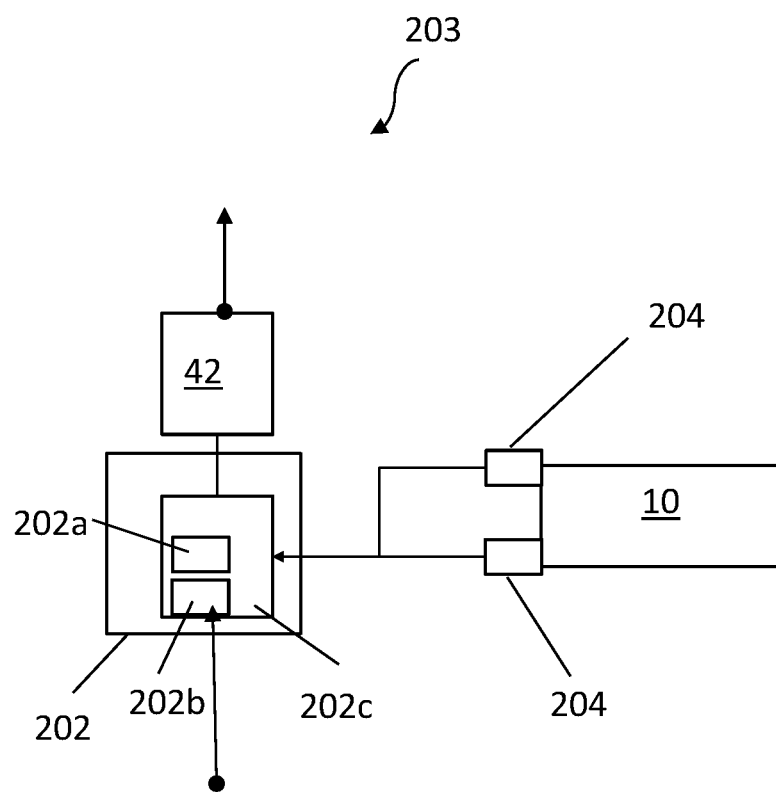
FIG. 8 is a schematic view of an aircraft fuel composition tracking system, in context with a fuel supply line and on-board tank, for use as a fuel composition determination module.
Figure 9:
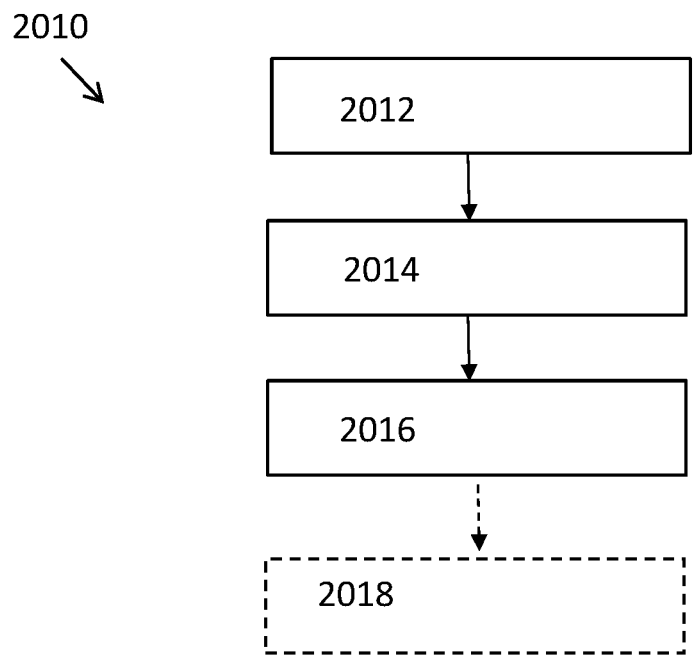
FIG. 9 is a schematic representation of a different fuel characteristic determination method from that shown in FIG. 7.
Figure 10:
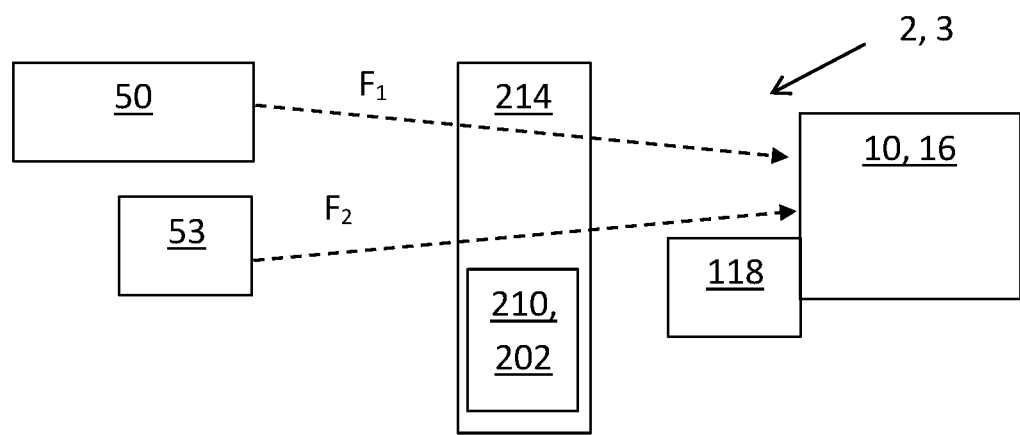
FIG. 10 is a schematic representation of a propulsion system including an active fuel management system.

In the example shown, two sensors 204 are provided, each arranged to physically and/or chemically detect one or more features of gas turbine engine performance. In different implementations, different numbers and/or types of sensors may be provided. For example, one or more pressure and/or temperature sensors 204 may be provided, a fuel flow rate sensor may be provided, and/or one or more chemical sensors may be provided, e.g. to detect exhaust characteristics or fuel components. The sensors 204 and the fuel composition tracker 202 together may be described as a fuel composition tracking system 203, as shown in FIG. 8. In some implementations, pre-existing sensors may be used such that implementing the method 2090 described below may not require any hardware changes. In other implementations, one or more additional sensors may be added to the propulsion system 2.

The fuel composition tracking system 203 comprises a fuel composition tracker 202, or other fuel composition determination module 210. The fuel composition tracker 202 of the example being described comprises memory 202*a* arranged to store the current fuel characteristic data, and processing circuitry 202*c* arranged to calculate updated values for the one or more fuel characteristics of the fuel being combusted in the engine 10. The calculated values may then replace the previously stored fuel characteristic data in the memory, and/or may be time- and/or date-stamped and added to the memory. A log of fuel characteristic data with time may therefore be assembled. In other implementations, a log might not be kept and indeed instantaneous control decisions may be made without storing the fuel composition data for a prolonged period. In such implementations, the term fuel composition determination module 210 may be preferred over fuel composition tracker 202, as past data may not be tracked—the terms may otherwise be used synonymously.

In the implementation shown in FIG. 6, a separate fuel composition determination module 210 is provided for each gas turbine engine 10. In other implementations, only a single fuel composition determination module 210 may be provided.

The fuel composition tracker 202, 210 of the example shown also includes a receiver 202*b* arranged to receive data relating to fuel composition and/or requests for fuel composition information.

The propulsion system 2 may include an electronic engine controller 42 arranged to issue propulsion system control commands based on the determined fuel characteristics, based on data provided by the fuel composition tracker 202 and optionally other data. The fuel composition tracker 202 of the example shown may be a part of or be in communication with the electronic engine controller (EEC) 42, and the EEC 42 may be arranged to issue propulsion system control commands based on the fuel characteristics. It will be appreciated that an EEC 42 may be provided for each gas turbine engine 10 of the aircraft 1, and/or that the role played by the EEC 42 in or for the fuel composition tracker 202 may be just a small part of the functionality of the EEC. Indeed, the fuel composition tracker 202 may be provided by the EEC 42, or may comprise an EEC module distinct from the engine's EEC 42 in various implementations. In alternative examples, the fuel composition tracker 202 may not comprise any engine control functionality, and may instead simply supply fuel composition data on demand, to be used as appropriate by another system. The fuel composition tracker 202 may be provided as a separate propulsion system controlling unit built into the propulsion system 2, and/or as software and/or hardware incorporated into other aircraft control systems. Fuel composition tracking abilities may be provided as part of the same unit or package as engine control functionality, or separately.

The EEC 42, which may also be thought of as a propulsion system controller, may make changes to the propulsion system 2 directly, or may provide a notification to the pilot recommending the change, for approval, as discussed above. In some examples, the same propulsion system controller 42 may automatically make some changes, and request others, depending on the nature of the change, as discussed above.

The propulsion system controller 42 may also provide recommendations regarding flight profile changes. Alternatively or additionally, the propulsion system 2 may further comprise a flight profile adjustor arranged to change a planned flight profile based on the one or more fuel characteristics of the fuel, and optionally other data. The flight profile adjustor may be provided as a separate propulsion system controlling unit built into the propulsion system 2, and/or as software and/or hardware incorporated into the pre-existing aircraft control systems. Fuel composition tracking abilities may be provided as part of the same unit or package.

A method 2090 of determining one or more fuel characteristics of a fuel provided to a gas turbine engine 10 of an aircraft 1 may therefore be implemented, the gas turbine engine 10 forming part of a propulsion system 2.

The method 2090 comprises making 2092 an operational change, the operational change being brought about by a controllable component of the propulsion system 2 and arranged to have a measurable effect on operation of the gas turbine engine 10. The operational change is any suitable change to operation of the propulsion system which will have an effect on operation of the gas turbine engine 10, and may be or comprise moving a component of the propulsion system 2 (e.g. moving a VIGV, changing pump speed, diverting fuel, and/or opening a bleed valve), or may be or comprise not moving a component of the propulsion system 2 in a situation in which, following normal operational procedures, it would normally be moved. The operational change may be temporary, and may be reversed as soon as enough time has elapsed for any effect on operation of the gas turbine engine 10 to be sensed (noting that a time interval may be left to allow for any transient effects to subside in some cases, as described in more detail below).

The method 2090 further comprises sensing 2094 a response to the operational change—for example a change in one or more pressures, temperatures, shaft speeds, and/or ratios such as the engine pressure ratio. Alternatively or additionally, the change may be a change in contrail formation, coking, or any other suitable engine parameter. The response over time may be assessed instead of, or as well as, looking at values at set time-points before and after the change.

The method 2090 further comprises determining 2096 the one or more fuel characteristics of the fuel being combusted by the gas turbine engine 10 based on the response to the operational change.

In some implementations, the method 2090 may further comprise making 2098 one or more changes to aircraft operation and/or planned flight profile after the determination 2096 is made, based on the determined fuel characteristic(s), for example so as to improve engine efficiency or reduce climate impact (e.g. by adjusting contrail formation). In other implementations, the knowledge of fuel characteristics may not be used to change aircraft operation, but may be used to influence refuelling choices and/or to verify that fuel data supplied for a fuel are correct. In cases of a significant mis-match between the determined fuel characteristics and expected fuel characteristics, the aircraft 1 may be returned to a refuelling station for checking of the fuel, and/or supplemental checks may be performed. The EEC 42 may be arranged to provide a warning/alert to a pilot in such scenarios. In some implementations, the "experiment" may therefore be performed very early in aircraft operation—e.g. during engine warm-up and/or other pre-taxi operations, or during the early stages of taxiing, so as to facilitate return to a refuelling station if required.

The operational change made at step 2092 may temporarily have a (generally minor) detrimental effect on engine operation; for example decreasing efficiency or pushing the propulsion system 2 closer to the bounds of its operating envelope—such a temporary detrimental effect on engine operation may be acceptable due to the improvements to engine performance which may then be made once the fuel characteristics are known; optimising engine performance for the fuel type. In some implementations, the operational change made at step 2092 may be made whilst the engine 10 is idling with the aircraft 1 on the ground, such that operation in flight is never detrimentally impacted. In implementations with multiple fuel sources, the fuel or blend supplied to the engine 10 may be changed during idle to allow one or more fuel characteristics of each stored fuel to be determined and stored for future reference.

In implementations in which a fuel composition tracker 202 as described above is used to perform the method 2090, the fuel composition tracker 202 may be arranged to:
receive information regarding an operational change, the operational change being effected by a controllable component of the propulsion system 2 and arranged to affect operation of the gas turbine engine 10;
receive data corresponding to a response to the operational change; and
determine one or more fuel characteristics of the fuel arranged to be provided to the gas turbine engine 10 based on the response to the operational change, as determined from the received data.

In the examples described hereinbelow, one or more temperatures and/or pressures within the gas turbine engine 10 (and optionally a relationship between temperatures and/or pressures at different points within the gas turbine engine 10) are used to determine, or provide data useful in the determination of, one or more fuel characteristics of the fuel currently being combusted in the engine 10.

In particular, in examples using one or more temperatures, each temperature or the temperature relationship is noted for a first fuel, and then noted again after a change in the fuel. A difference in the fuel characteristics, e.g. an increased calorific value, may therefore be determined from a difference in the temperature(s) or temperature relationship. Instead of "performing an experiment" for a single fuel currently being combusted, the fuel change is the difference, and a response to the fuel change is used to determine one or more fuel characteristics.

For example, T41, or a relationship between T30 and T41, may change depending on the % SAF of a fuel if automatic VIGV adjustment (e.g. to keep T41 or the temperature relationship constant) is cancelled or delayed. A change of around 5° C. in T41 may occur, for example, if changing between kerosene and a currently used SAF. It will be appreciated that VIGV scheduling may be traditionally based on maintaining a constant level of one or more of T40, T41, T30, or the T30-T41 relationship, and that allowing temperature to change and seeing by how much, rather than automatically moving VIGVs 246, may allow fuel characteristics to be inferred.

Changes in the temperature(s) or in a temperature relationship may be used to identify relative fuel characteristics, rather than absolute values—e.g. an 8% increase in calorific value as compared to the previous, or reference, fuel—in some examples. In other examples, absolute values may be calculated, optionally by reference to data which may include absolute values for the previous or reference fuel.

One or more pressures might also change—in some cases, pressures and temperatures may both be monitored, and a sensed change in one used to verify a sensed change in the other.

In additional or alternative examples using pressures, one or more pressures and/or a pressure relationship is noted for a first fuel, and then noted again after a change in the fuel. A difference in the fuel characteristics, e.g. an increased calorific value, may therefore be determined from a difference in the pressure(s) or pressure relationship. As for temperature changes, changes in the pressure(s) may be used to identify relative fuel characteristics, rather than absolute values—e.g. an 8% increase in calorific value as compared to the previous, or reference, fuel—in some examples. In other examples, absolute values may be calculated, optionally by reference to data for the previous or reference fuel.

In various examples, both pressures and temperatures are sensed, measured, calculated, or otherwise inferred, and both may be used in determining fuel characteristics.

The propulsion system 2 may comprise one or more variable inlet guide vanes—VIGVs 246—and also a fuel pump. No change to the position of VIGVs 246 and/or to the fuel flow rate may be made on changing fuel, at least until after updated temperature and/or pressure data have been collected, so as to allow monitoring of any change in the temperature(s) and/or pressure(s) with minimal interference/minimal variation of engine control beyond fuel type.

Multiple temperature relationships, between multiple gas turbine engine temperatures, may be used in some examples. In additional or alternative examples, multiple pressure relationships, between multiple gas turbine engine pressures, may be used.

In the examples being described, combustion equipment 16, for example being or comprising a combustor 16, combusts the fuel within the gas turbine engine 10. The combustor 16 has an exit, and a combustor exit temperature—T40—is defined as an average temperature of airflow at the combustor exit at cruise conditions. Similarly, a combustor exit pressure—P40—is defined as the total pressure of airflow at the combustor exit at cruise conditions. Airflow from the combustor 16 then enters a turbine 17.

In the examples being described, a turbine 17 of the engine 10 comprises a rotor having a leading edge and a trailing edge. A turbine rotor entry temperature—T41—is defined as an average temperature of airflow at the leading edge of the rotor of the turbine 17 at cruise conditions. Similarly, a turbine rotor entry pressure—P41—is defined as the total pressure of airflow at the leading edge of the rotor of the turbine 17 at cruise conditions.

The engine also comprises a compressor 15 having an exit, and a compressor exit temperature—T30—is defined as an average temperature of airflow at the exit from the compressor 15 at cruise conditions. Similarly, a compressor exit pressure—P30—is defined as the total pressure of airflow at the exit from the compressor 15 at cruise conditions. In some examples, the gas turbine engine 10 comprises multiple compressors 14, 15; the compressor exit temperature or pressure may be defined as the temperature or pressure at the exit from the highest pressure compressor 15. The compressor may comprise one or more rotors each having a leading edge and a trailing edge; the compressor exit temperature or pressure may be defined as the temperature or pressure at the axial position of the trailing edge of the rearmost rotor of the compressor.

One or more of the listed temperatures and/or pressures is used to determine one or more fuel characteristics. A change in a relationship between T41 and T30, and/or between P41 and P30, may be used to determine the one or more fuel characteristics. T40 or P40 may be used in addition to, or instead of, T41 or P41 in some examples.

In various implementations, cooling air that is at T30 temperatures may be introduced across a nozzle guide vane at the exit of the combustor 16, between the T40 and T41 stations. In some implementations, especially in implementations in which the amount of cooling air added varies, T40 may be selected in place of T41 to avoid any variability in T41 due to the amount of cooling air influencing the relationship/temperature changes.

As mentioned above, T30, T41, P30, and P41 and any other numbered pressures and temperatures listed herein are defined using the station numbering listed in standard SAE AS755, in particular:
P30=High Pressure Compressor (HPC) Outlet Total Pressure
T30=HPC Outlet Temperature
P40=Combustion Exit Total Pressure
T40=Combustion Exit Temperature
P41=High Pressure Turbine (HPT) Rotor Entry Total Pressure
T41=HPT Rotor Entry Temperature In current engines 10, T40 and T41 are generally not measured directly using conventional measurement technology, such as thermocouples, due to the high temperature. A direct temperature measurement may be taken optically but, alternatively or additionally, T40 and/or T41 values may instead be inferred from other measurements (e.g. using readings from thermocouples used for temperature measurement at other stations and knowledge of the gas turbine engine architecture and thermal properties).

The relationship between pressure or temperature values at station 30 and at station 40 or 41 depends on how the engine 10 is being controlled/on what parameter is being held constant.

For example, for an engine 10 running at a fixed (gravimetric) fuel flow rate, T41 would generally increase with the introduction of SAF, or a blend including more SAF, due to the generally higher calorific value. This change in T41 (or equivalently in T40) is then followed by a corresponding increase in shaft speeds and in T30/P30. After the transient changes in the relationship on the change in fuel type, the steady state T30-T41 relationship may return to its initial status.

If instead the engine 10 is run with a fixed shaft speed, fuel mass flow drops when a higher calorific value fuel is used, and the core flow goes up. After the transient changes in the relationship on the change in fuel mass flow rate, the steady state T30-T41 relationship may again return to its initial status.

In examples in which relative temperatures and/or pressures (temperature or pressure relationships) are used, a change in the relationship between the temperatures and/or pressures over time around the change of fuel may be used to infer or calculate one or more fuel characteristics, instead of, or as well as, looking at a ratio of, or difference between, the selected temperatures or pressures at a single point in time before the change and a single point in time after the change. Information may therefore be gleaned from the transient behaviour.

In some examples, the aircraft 1 may have only a single fuel tank 50, and/or may have multiple fuel tanks 50, 53 which each contain the same fuel, and/or are fluidly linked, or fluidly connected to the gas turbine engine 10, such that only a single fuel type is supplied to the gas turbine engine 10 between refuelling events—i.e. the fuel characteristics may remain constant throughout a flight. In such examples, the change in the temperature(s) and/or pressure(s) may therefore be noted based on saved data for an earlier flight (since the last refuelling event) or an earlier stage of the same flight compared to current data, rather than taking pressure and/or temperature data before and after a change made during the same flight. Additionally or alternatively, temperature and/or pressure relationship data for a reference, or standard, fuel may be supplied and current data compared to that. However, it will be appreciated that, due to the number of potential variables involved and the possibility of some sensor data not being precise (e.g. fuel flow rate), it may be preferable to use data from immediately before and after a given change in the determination described (allowing for any transients), and/or from over the course of the fuel change (including transient behaviour), so as to minimise uncontrolled variables and/or changes in environmental parameters. The examples currently being described may therefore have particular utility in examples with at least two fuel sources.

In such examples, the aircraft 1 may have a plurality of fuel tanks 50, 53 which may contain fuels of different compositions, and the propulsion system 2 may comprise an adjustable fuel delivery system, allowing a selection to be made of which tank(s) 50, 53, and therefore what fuel/fuel blend, to use. In such examples, the fuel characteristics may vary over the course of a flight. The temperature(s) and/or pressure(s) may be checked every time a change in the fuel is made, so as to allow properties of the current fuel to be determined. Alternatively, the temperature(s) and/or pressure(s) may be checked only when switching to a new tank 50, 53, or new fuel blend, for which fuel characteristics have not previously been determined and stored. In such examples, the temperature and/or pressure monitoring may be performed at multiple different times, with an active fuel management system 214 being arranged to change the fuel, or fuel blend, in between. Fuel characteristics for the multiple different fuels $F_1$, $F_2$ onboard may therefore be determined. The changing of the fuel supplied to the gas turbine engine 10 may be performed at cruise, so as to allow the monitoring of the temperature(s) and/or pressure(s) to be performed under relatively constant conditions, such that the change of fuel is effectively the only change. This may allow more accurate determination of any change in the temperature and/or pressure relationship(s). Similarly, the changing of the fuel supplied to the gas turbine engine 10 may be performed at ground idle, for example before take-off. Again, this may provide relatively constant conditions, such that the change of fuel is effectively the only change.

The temperature(s) and/or pressure(s) may therefore be monitored in two different time periods—one each for the two different fuels $F_1$, $F_2$, or over a single time period including the change of fuel. The change in fuel may be the only change made to engine control between the two time periods/over the single time period. Where two separate time periods are used, the two time periods may also be selected such that altitude and/or other external parameters are at least substantially the same for both, and may therefore be selected to be close to each other in time, if not immediately consecutive. An interval may be left between the two time periods to allow for any transient behaviour around the change in fuel. Similarly, where a single time period is used, it may be selected to be short enough for altitude and/or other external parameters to be at least substantially the same throughout.

When changes are assessed between two separate time periods, as described above, it may be desirable to have the first and second time periods as close together as reasonably possible—a small interval may be left to ensure a complete change of fuel in the combustor 16 and allow for any transient effects to pass. (In other implementations, the transient behaviour itself may be used to determine the one or more fuel characteristics.) The required interval size (if any) may depend on fuel flow rate at the operating condition. The gas turbine engine 10 generally reacts almost instantly (within a second) to differences in fuel once that fuel reaches the combustor 16, and speed probes used for shaft speed measurements generally have a low time constant. At relatively low power, low fuel flow rate conditions, an interval of around ten seconds from when the fuel entering the pylon which connects the engine 10 to the airframe of the aircraft 1 changes may be used. At higher power, where fuel flow rate may be four or more times higher, and interval of 2-3 seconds from fuel change on pylon entry may be appropriate. It will be appreciated that travel time from a fuel tank to the engine 10 may vary based on tank location as well as fuel flow rate, and can be accommodated accordingly with knowledge of the specific aircraft 1—pylon entry is therefore mentioned here for ease of generalisation, although time change from opening or closing of a valve at or near a fuel tank 50, 53, or activation or deactivation of a fuel pump 108, may be used in various implementations, with the interval calculated with reference to fuel flow time between the point of interest and the engine 10.

Further, measurements may be averaged over a period of time (e.g. 5 seconds up to 30 seconds) within each time period, or in the second time period only, and any trends examined, to check that a new steady state has been reached and/or to improve reliability.

Based on knowledge of the fuel characteristics, a specific fuel or fuel blend may be selected to improve operation at certain flight stages or in certain external conditions.

Additional data may be used in conjunction with the determined fuel characteristics to adjust control of the propulsion system 2 and/or changes to the flight profile. For example, the method may comprise receiving data of current conditions around the aircraft 1 (either from a provider, such as a third-party weather-monitoring company, or from onboard detectors). These received data (e.g. weather data, temperature, humidity, presence of a contrail, etc.) may be used to make or influence changes in propulsion system control. Instead of, or as well as, using "live" or near-live weather data, forecast weather data for the aircraft's route may also be used to estimate current conditions. As used herein, the term "flight profile" refers to the operational characteristics (e.g. height/altitude, power setting, flight path angle, airspeed, and the like) of an aircraft as it flies along a flight track, and also to the trajectory/flight track (route) itself. Changes of route (even of just 100 m or so) are therefore included in the term "flight profile" as used herein.

Examples of options for control of the propulsion system 2 based on knowledge of fuel characteristics include those listed above.

A propulsion system 2 for an aircraft 1 may therefore comprise a fuel composition tracker 210 arranged to record and store fuel characteristic data, and optionally also to receive measurement data relating to temperatures and/or pressures within the gas turbine engine 10, and determine one or more fuel characteristics based on that data (the determination optionally involving calculating a temperature and/or pressure relationship between multiple temperatures or pressures, respectively) and optionally other data, such as measurement data relating to responses to one or more operational changes (non-limiting examples of suitable operational changes are listed above).

The fuel composition tracker 210 may be provided as a separate fuel composition tracking unit 210 built into the propulsion system 2, and/or as software and/or hardware incorporated into the pre-existing aircraft control systems.

Data from the fuel composition tracker 210 may be used to adjust control of the propulsion system 2, based on the one or more fuel characteristics.

A plurality of temperature and/or pressure sensors 204 may be provided in selected locations within the gas turbine engine 10. In the examples being described, multiple sensors are provided for each location of interest, optionally being symmetrically arranged around the turbine rotor entry, for example, so as to provide improved accuracy of the temperature and/or pressure measurements obtained.

In the example shown, two sensors 204 are provided, each arranged to detect one or more pressures or temperatures relating to gas turbine engine performance—the sensors may measure one or more of P30, T30, P40, T40, P41, and T41 directly, or may provide other measurements from which one or more of those values can be calculated or inferred. In different implementations, different numbers and/or types of sensors may be provided, as described above.

The sensors 204 and the fuel composition tracker 202 together may be described as a fuel composition tracking system 203, as shown in FIG. 8, and a fuel composition tracking system 203 and EEC 42 may be as described above.

A method 2010 of determining one or more fuel characteristics of a fuel provided to a gas turbine engine 10 of an aircraft 1 may therefore be implemented, the gas turbine engine 10 forming part of a propulsion system 2.

The method 2010 comprises changing 2012 the fuel supplied to a gas turbine engine 10 of an aircraft 1. The change 2012 may be made during operation of the aircraft 1—e.g. by using a fuel management system 214 to take fuel from a different tank 50, 53—or between different sessions of operation of an aircraft 1—e.g. on refuelling an aircraft 1 with a new fuel. The fuel change may be temporary, and may be reversed as soon as enough time has elapsed for any effect on the temperature(s) and/or pressure(s) to be sensed.

The method 2010 further comprises sensing 2014 a response to the change of fuel, and in particular sensing, determining, or inferring a change to at least one selected temperature and/or pressure. Optionally two or more temperatures or pressures may be sensed, such that a relationship between P30 and one or more of P41 and P40, or T30, and one or more of T41 and T40, may be determined based on sensor data. For example, a change in one or more of the listed pressures and/or temperatures may be sensed directly or inferred/determined/calculated from other measurements and knowledge of the engine 10.

The method 2010 further comprises determining 2016 one or more fuel characteristics of the fuel being combusted by the gas turbine engine 10 based on the response to the fuel change. For example, a percentage change in calorific value between the first fuel (prior to the change) and the second fuel may be determined, so as to provide knowledge of relative fuel properties, and/or an actual calorific value may be determined (either directly, or using knowledge of values for the first fuel).

The fuel change 2012, and the following steps of the method 2010, may be repeated to confirm the obtained fuel characteristics.

In some implementations, the method 2010 may further comprise making 2018 one or more changes to aircraft operation and/or to a planned flight profile after the determination 2016 is made, based on the determined fuel characteristic(s), for example so as to improve engine efficiency or reduce climate impact (e.g. by adjusting contrail formation). In other implementations, the knowledge of fuel characteristics may not be used to change aircraft operation, but may be used to influence refuelling choices and/or to verify that fuel data supplied for a fuel are correct. In cases of a significant mis-match between the determined fuel characteristics and expected fuel characteristics, the aircraft 1 may be returned to a refuelling station for checking of the fuel, and/or supplemental checks may be performed. The EEC 42 may be arranged to provide a warning/alert to a pilot in such scenarios.

In implementations in which a fuel composition tracker 202, 210 as described above is used to perform some or all of the method 2010, the fuel composition tracker 202, 210 may be arranged to receive data corresponding to a change in one or more of T30, P30, T40, T41, P40 and P41; and determine one or more fuel characteristics of the fuel based on the change in the temperature(s) and/or pressure(s).

In some cases, the fuel composition tracker 202, 210 may be arranged to:
 receive data corresponding to a change in a relationship between T30 (or P30) and one of T40 and T41 (or one of P40 and P41); and
 determine one or more fuel characteristics of the fuel based on the change in the temperature and/or pressure relationship.

In examples with two or more fuel sources, the propulsion system 2 may further comprise a fuel management system, e.g. fuel manager 214, arranged to change the fuel supplied to the gas turbine engine 10 in flight; for example by actively selecting a particular tank 50, 53, or particular fuel blend from multiple tanks, in flight. A propulsion system controller (e.g. the EEC 42) may be used to adjust control of the propulsion system 2 based on the one or more fuel characteristics of the fuel, based on data provided by the fuel composition tracker 202 and optionally other data. The propulsion system controller 42 may be provided as a separate propulsion system controlling unit built into the propulsion system 2, and/or as software and/or hardware incorporated into the pre-existing aircraft control systems. Fuel composition tracking abilities may be provided as part of the same unit or package.

As described above, the propulsion system controller 42 may make changes to the propulsion system directly, or may provide a notification to the pilot recommending the change, for approval. In some examples, the same propulsion system controller 42 may automatically make some changes, and request others, depending on the nature of the change, as discussed above.

The propulsion system controller 42 may also provide recommendations regarding flight profile changes. Alternatively or additionally, the propulsion system 2 may therefore comprise a flight profile adjustor arranged to change the planned flight profile based on the one or more fuel characteristics of the fuel, and optionally other data. The flight profile adjustor may be provided as a separate propulsion system controlling unit built into the propulsion system 2, and/or as software and/or hardware incorporated into the pre-existing aircraft control systems such as the EEC 42. Fuel composition tracking abilities may be provided as part of the same unit or package.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of determining at least one fuel characteristic of a fuel provided to a gas turbine engine of an aircraft, the gas turbine engine forming part of a propulsion system, the method comprising:

making an operational change, the operational change being effected by a controllable component of the propulsion system and arranged to affect operation of the gas turbine engine;

sensing a response to the operational change; and determining the at least one fuel characteristic based on the response to the operational change, wherein the at least one fuel characteristic comprises at least one of:
i. percentage of sustainable aviation fuel in the fuel;
ii. sulphur content of the fuel;
iii. oxygen content of the fuel;
iv. thermal stability of the fuel; and
v. an indication that the fuel is a fossil fuel.

2. The method of claim 1, wherein the propulsion system comprises a heat management system, and wherein the making the operational change comprises using the heat management system to change the temperature of fuel entering a combustor of the gas turbine engine.

3. The method of claim 2, wherein the response to the operational change comprises at least one of:
(i) a change in power output from the gas turbine engine;
(ii) a change in fuel degradation or coking;
(iii) a change in at least one pressure within the engine; and
(iv) a change in at least one temperature within the engine.

4. The method of claim 1, wherein the propulsion system comprises at least one variable inlet guide vane-VIGV, and wherein the making an operational change comprises changing VIGV scheduling.

5. The method of claim 4, wherein the response to the operational change comprises at least one of:
(i) a change in gas temperature at the entrance to a turbine of the gas turbine engine; and
(ii) temperature rise across a combustor of the gas turbine engine.

6. The method of claim 1, wherein the propulsion system comprises a plurality of fuel tanks, and wherein the making an operational change comprises changing from which tank fuel is taken.

7. The method of claim 6, wherein the response to the operational change comprises at least one of:
(i) a change in power output from the gas turbine engine;
(ii) a change in fuel degradation or coking;
(iii) a change in contrail formation;
(iv) a change in the relationship between a compressor exit temperature and a turbine rotor entry temperature; and
(v) a change in the relationship between a compressor exit total pressure and a turbine rotor entry total pressure.

8. The method of claim 1, wherein the propulsion system comprises a plurality of fuel tanks, and wherein the making an operational change comprises changing what percentage of fuel is taken from a particular tank.

9. The method of claim 8, wherein the response to the operational change comprises at least one of:
(i) a change in power output from the gas turbine engine;
(ii) a change in fuel degradation or coking;
(iii) a change in contrail formation;
(iv) a change in the relationship between a compressor exit temperature and a turbine rotor entry temperature; and
(v) a change in the relationship between a compressor exit total pressure and a turbine rotor entry total pressure.

10. The method of claim 1, wherein the propulsion system comprises at least one air-oil heat exchanger, and wherein the making an operational change comprises changing at least one of air flow rate and oil flow rate through the air-oil heat exchanger.

11. The method of claim 10, wherein the response to the operational change comprises a pressure change within a fuel system of the gas turbine engine.

12. A propulsion system for an aircraft comprising:
a gas turbine engine;
a fuel tank arranged to contain a fuel to power the gas turbine engine; and
processing circuitry programmed to:
receive information regarding an operational change, the operational change being effected by a controllable component of the propulsion system and arranged to affect operation of the gas turbine engine;
receive data corresponding to a response to the operational change; and
determine at least one fuel characteristic of the fuel arranged to be provided to the gas turbine engine based on the response to the operational change,
wherein the at least one fuel characteristic comprises at least one of:
i. percentage of sustainable aviation fuel in the fuel;
ii. sulphur content of the fuel;
iii. oxygen content of the fuel;
iv. thermal stability of the fuel; and
v. an indication that the fuel is a fossil fuel.

13. The propulsion system of claim 12, further comprising at least one sensor arranged to sense the response to the operational change and to provide data to the processing circuitry.

14. The propulsion system of claim 12, wherein the at least one sensor comprises at least one of:
(i) a temperature sensor; and
(ii) a pressure sensor.

15. The propulsion system of claim 12, further comprising at least one variable inlet guide vane-VIGV, and wherein the operational change comprises changing VIGV scheduling.

16. The propulsion system of claim 12, comprising a plurality of fuel tanks, and wherein the operational change comprises changing from which tank fuel is taken.

17. The propulsion system of claim 12, comprising a plurality of fuel tanks, and wherein the operational change comprises changing what percentage of fuel is taken from a particular tank.

18. The propulsion system of claim 12, further comprising at least one air-oil heat exchanger, and wherein the operational change comprises changing at least one of air flow rate and oil flow rate through the air-oil heat exchanger.

19. A method of determining at least one fuel characteristic of a fuel provided to a gas turbine engine of an aircraft, the gas turbine engine forming part of a propulsion system, the method comprising:
making an operational change, the operational change being effected by a controllable component of the propulsion system and arranged to affect operation of the gas turbine engine;
sensing a response to the operational change; and
determining the at least one fuel characteristic based on the response to the operational change,
wherein:
the response to the operational change comprises at least one of:

(i) a change in power output from the gas turbine engine;
(ii) a change in fuel degradation or coking; and
(iii) a change in at least one pressure within the engine; and the at least one fuel characteristic comprises at least one of:

i. percentage of sustainable aviation fuel in the fuel;
ii. sulphur content of the fuel;
iii. oxygen content of the fuel;
iv. thermal stability of the fuel; and
v. an indication that the fuel is a fossil fuel.

\* \* \* \* \*